(12) United States Patent
Hanaoka

(10) Patent No.: US 7,864,280 B2
(45) Date of Patent: Jan. 4, 2011

(54) LIQUID CRYSTAL DISPLAY DEVICE

(75) Inventor: Kazutaka Hanaoka, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 143 days.

(21) Appl. No.: 12/296,341

(22) PCT Filed: May 8, 2007

(86) PCT No.: PCT/JP2007/059489

§ 371 (c)(1),
(2), (4) Date: Oct. 7, 2008

(87) PCT Pub. No.: WO2007/135853

PCT Pub. Date: Nov. 29, 2007

(65) Prior Publication Data

US 2009/0180057 A1 Jul. 16, 2009

(30) Foreign Application Priority Data

May 19, 2006 (JP) .............................. 2006 140930

(51) Int. Cl.
G02F 1/133 (2006.01)
G02F 1/141 (2006.01)
G02F 1/1333 (2006.01)
G02F 1/1339 (2006.01)
G02F 1/1343 (2006.01)
C09K 19/02 (2006.01)

(52) U.S. Cl. .......................... 349/134; 349/33; 349/89; 349/147; 349/155; 349/167

(58) Field of Classification Search .................. 349/33, 349/89, 134, 147, 155, 167
See application file for complete search history.

(56) References Cited

U.S. PATENT DOCUMENTS 5,668,651 A 9/1997 Yamada et al.

(Continued)

FOREIGN PATENT DOCUMENTS

JP 2001-166341 6/2001

(Continued)

OTHER PUBLICATIONS

International Search Report for PCT/JP2006/059489 mailed Jul. 31, 2007.

(Continued)

*Primary Examiner*—Mark A Robinson
*Assistant Examiner*—Jerry Blevins
(74) *Attorney, Agent, or Firm*—Nixon & Vanderhye, P.C.

(57) ABSTRACT

It is to provide a liquid crystal display device capable of readily obtaining bend alignment across an entire liquid crystal display panel of the liquid crystal display device, with obtaining brightness while obtaining a high speed responsiveness, a feature of an OCB mode, as well as without increasing a load on an activating driver. The liquid crystal display device is arranged such that: a liquid crystal molecule in a liquid crystal layer sandwiched between a pair of substrates facing each other has a pretilt angle of not less 18° and not more than 36°; a product Δnd of a refractive index anisotropy Δn and a thickness d of the liquid crystal layer is not less than 850 nm and not more than 1170 nm; and a lateral electric field generating structure for applying an electric field parallel to the substrates and bend-aligning the liquid crystal molecules is provided in a region corresponding to a pixel.

9 Claims, 17 Drawing Sheets

U.S. PATENT DOCUMENTS

| | | |
|---|---|---|
| 6,222,605 B1 | 4/2001 | Tillin et al. |
| 6,515,724 B1 | 2/2003 | Hattori et al. |
| 6,515,725 B1 | 2/2003 | Hattori et al. |
| 2001/0030726 A1* | 10/2001 | Yoshida et al. .............. 349/117 |
| 2002/0054264 A1* | 5/2002 | Kwag et al. ................. 349/143 |
| 2002/0085154 A1 | 7/2002 | Hattori et al. |
| 2002/0105613 A1 | 8/2002 | Yamakita et al. |
| 2002/0145579 A1* | 10/2002 | Yamakita et al. .............. 345/87 |
| 2002/0149551 A1 | 10/2002 | Yamakita et al. |
| 2003/0122767 A1 | 7/2003 | Nakao et al. |
| 2003/0156247 A1 | 8/2003 | Kishida et al. |
| 2003/0231272 A1* | 12/2003 | Nakamura et al. ......... 349/123 |
| 2004/0080698 A1 | 4/2004 | Hattori et al. |
| 2004/0257489 A1* | 12/2004 | Gotoh et al. .................. 349/44 |
| 2005/0168676 A1 | 8/2005 | Kishida et al. |
| 2007/0236631 A1 | 10/2007 | Ohtani et al. |
| 2008/0062368 A1 | 3/2008 | Kishida et al. |
| 2008/0106683 A1 | 5/2008 | Hanoaka et al. |
| 2008/0106687 A1 | 5/2008 | Kishida et al. |

FOREIGN PATENT DOCUMENTS

| | | |
|---|---|---|
| JP | 2006-113478 | 4/2006 |

OTHER PUBLICATIONS

Nakao et al., "High-Speed Bend Transition Method Using Electrical Twist Field in OCB Mode TFT-LCDs", SID 04 Digest, pp. 1416.

* cited by examiner

FIG. 8
| VENT SHAPE | 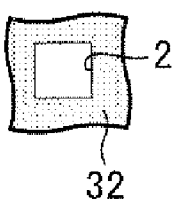 | 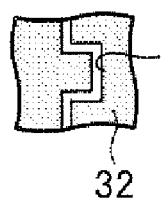 |
|---|---|---|
| TWO-LAYER (DIVERGENCE LATERAL ELECTRIC FIELD) SiN (3 μm) | × | × |
| TWO-LAYER (DIVERGENCE LATERAL ELECTRIC FIELD) SiN (0.5 μm) | △ | ○ |
※○: BEND NUCLEUS IS DEVELOPED、
　×: NOT DEVELOPED、
　△: DEVELOPMENTAL RATE<50%

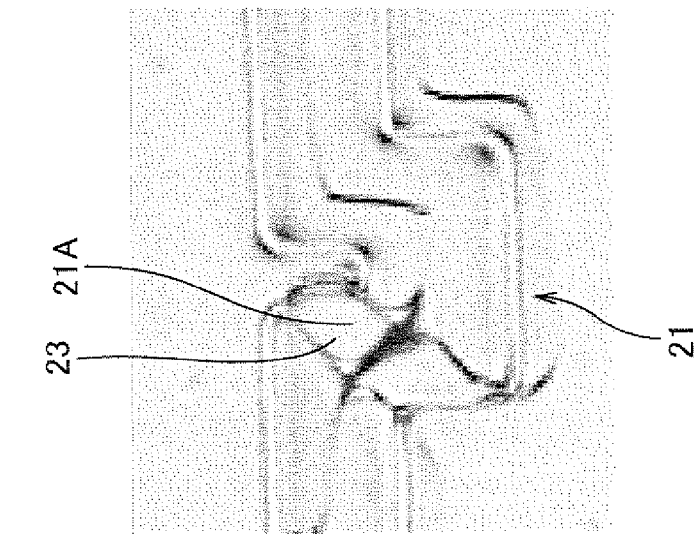
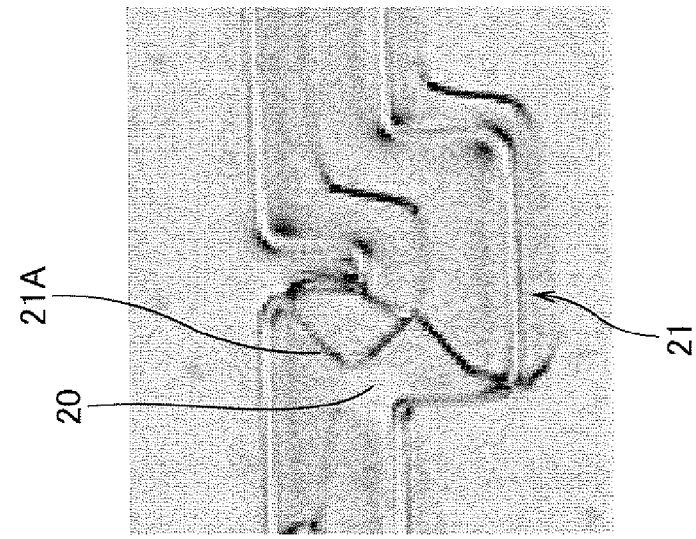
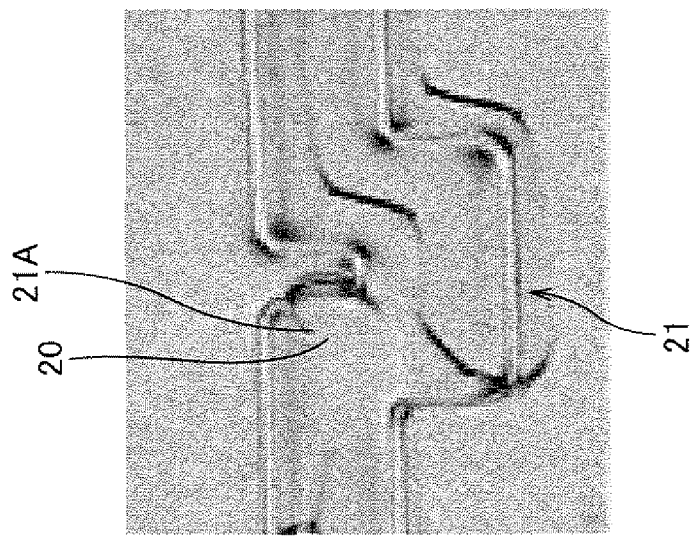

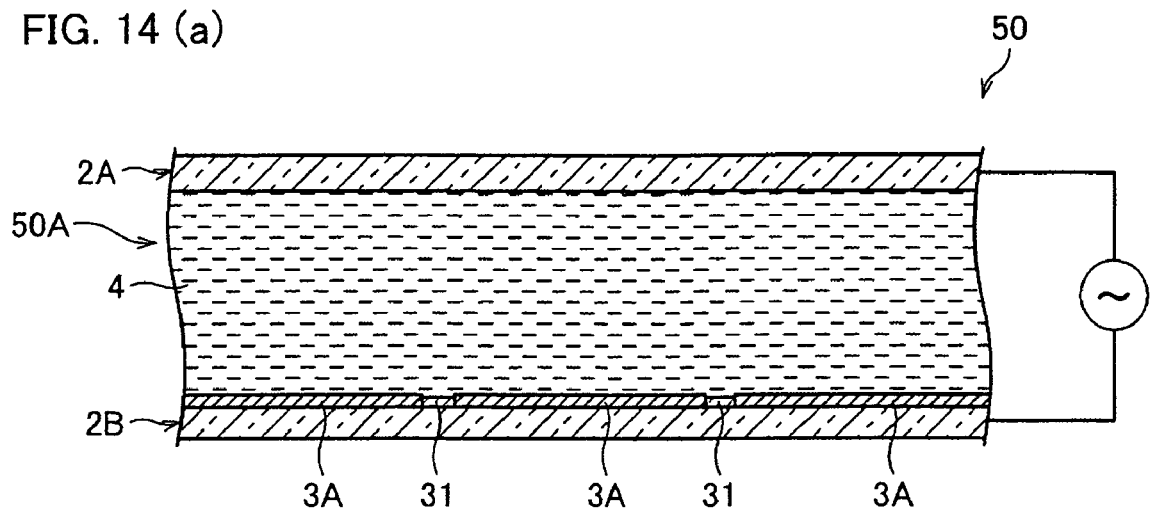
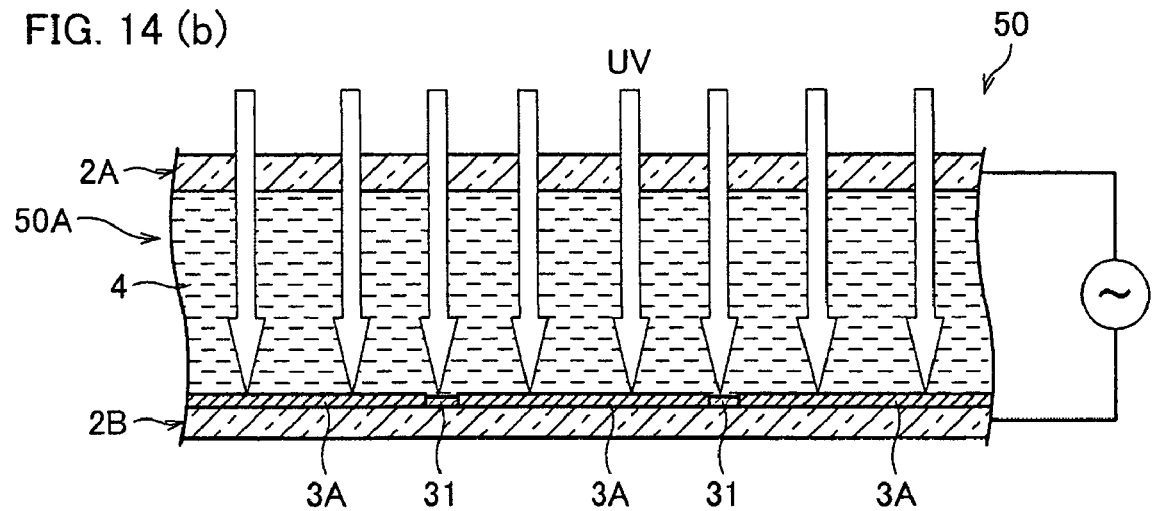
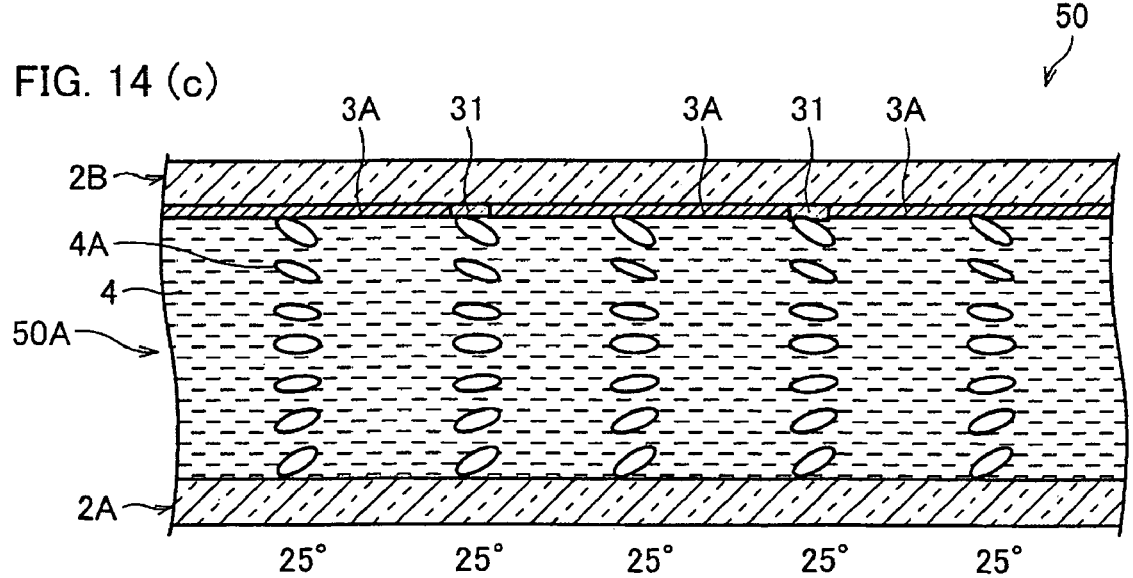

LIQUID CRYSTAL DISPLAY DEVICE

This application is the U.S. national phase of International Application No. PCT/JP2007/059489, filed 8 May 2007 which designated the U.S. and claims priority to Japanese Application No. 2006-140930, filed 19 May 2006, the entire contents of each of which are hereby incorporated by reference.

TECHNICAL FIELD

The present invention relates to a liquid crystal display device adopting a so-called OCB (Optically self-Compensated Birefringence) mode in which alignment of a liquid crystal molecular is transited from splay alignment to bend alignment by electric field application.

BACKGROUND ART

In recent years, liquid crystal display devices have been put into practical use widely as a mainstream of a large-sized display devices, because a high contrast and a wide view angle have been realized.

However, since a contour of a display image occasionally blurs on the liquid crystal display devices in the practical use contemporarily, there is a case that the liquid crystal display devices are not suitable for displaying a fast moving image. This is because the liquid crystal display devices have relatively slow response speeds.

Thus, an OCB mode, a liquid crystal mode principally having a fast response speed, has been expected to be adopted in the liquid crystal display devices hereafter.

However, in the OCB mode, it is extremely difficult to obtain bend alignment (bend orientation) an operating condition of the OCB mode. Thus, various techniques have been proposed to obtain the bend alignment.

Examples of such techniques encompass a technique for obtaining the bend alignment by applying a high voltage to a liquid crystal display panel as well as a technique for obtaining the bend alignment by using a structural object and/or a convex and concave structure (see Patent document 1).

Also, there has been proposed a technique for realizing a large pretilt angle with use of a polymer and stabilizing the bend alignment (see Patent documents 2 and 3).

Furthermore, there has been proposed a technique for developing a bend nucleus (origination of an alignment transition to the bend alignment) by a lateral electric field and the like (see Patent document 4 and non-Patent document 1).

(Patent Document 1)
Japanese Unexamined Patent Application, Tokukai, No. 2002-90747 (published on Mar. 27, 2002)
(Patent Document 2)
Japanese Patent No. 3050769 (published on Jun. 11, 1996, registered on Mar. 31, 2000)
(Patent Document 3)
Specification of U.S. Pat. No. 6,222,605 (registered on Apr. 24, 2001)
(Patent Document 4)
Japanese Unexamined Patent Application, Tokukai, No. 2003-107531 (published on Apr. 9, 2003)
(Non-Patent Document 1)
SID (The Society for Information Display) 2004 Digest, P1416

DISCLOSURE OF INVENTION

However, conventional techniques, e.g., a technique applying a high voltage to a liquid crystal display panel and a technique using a structural object, cause the following problems, respectively, that an effect of stably and readily obtaining bend alignment is small, that an enormous amount of load is put on an activating driver in a practical application of the technique to a product, and the like.

Besides, a conventional technique for using a large pretilt angle causes a problem that a practical dynamic range of retardation is reduced as the pretilt angle is increased, thereby causing brightness to be significantly lowered.

Furthermore, the technique using a bend nucleus causes the following problem when applied to a liquid crystal molecule having a low pretilt angle. That is, when the liquid crystal molecule has the low pretilt angle, it is difficult to develop the bend nuclei in all of pixels. In addition, there is a problem that it takes a time for the bend alignment to spread after being developed in the vicinity of the bend nucleus. As such, it is not possible to readily obtain the bend alignment across the entire liquid crystal display panel.

The present invention is made in the view of the problem, and an object of the present invention is to provide the liquid crystal display device capable of readily obtaining the bend alignment across the entire liquid crystal display panel of the liquid crystal display device, (i) with maintaining brightness while maintaining a high speed responsiveness, the feature of the OCB mode, and (ii) without increasing a load on the activating driver.

In order to attain the object, a liquid crystal display device in accordance with the present invention comprises a liquid crystal layer sandwiched between a pair of substrates facing each other, in which liquid crystal layer, a state of liquid crystal molecules is transited from splay alignment (splay orientation) to bend alignment when an electric field is applied, wherein: the liquid crystal molecules have a pretilt angle of not less than 18° and not more than 36°; a product $\Delta$nd of a refractive index anisotropy $\Delta$n of the liquid crystal molecules and a thickness d of the liquid crystal layer is not less than 850 nm and not more than 1170 nm; and an electric field applying section for (i) applying a lateral electric field parallel to the substrates and (ii) bend-aligning the liquid crystal molecules is provided in a region corresponding to a pixel on the liquid crystal layer.

Development of the bend nucleus and a splay-bend transition are deeply related to a size of the pretilt angle and the application of the lateral electric field.

As such, the present invention can simultaneously realize an increase in a developmental rate of the bend alignment and acceleration of spreading speed of the bend alignment, by having the electric field applying section for applying the lateral electric field parallel to the substrates and bend-aligning the liquid crystal molecules, in the region corresponding to the pixel in the liquid crystal layer.

However, if the pretilt angle is small, it is difficult to develop the bend nuclei in all the pixels. Furthermore, it is impossible to make only the development of the bend nucleus control the spreading speed at which the bend alignment spreads after the development of the bend nucleus.

On the other hand, realization of the large pretilt angle facilitates the splay-bend transition. However, since the pixels are separated (isolated) from each other, the bend alignment does not spread to the pixels in which the bend nuclei are not developed. Thus, some of the pixels remain in the state of the splay alignment. Such an alignment non-transition is more likely to be caused in an end part of the liquid crystal display device where a cell thickness and the pretilt angle change.

Thus, it is not possible to readily obtain the bend alignment across the entire liquid crystal display device without increasing the load on the activating driver, by simply having the large pretilt angle or simply applying the lateral electric field. In contrast, according to the present invention, it is possible to simultaneously realize the increase in the developmental rate of the bend alignment and the acceleration of the spreading speed, by providing the electric field applying section for applying the lateral electric field parallel to the substrates and bend-aligning the liquid crystal molecules, in the region corresponding to each of the pixels in the liquid crystal layer. Thus, for example, the alignment non-transition to the bend alignment is less likely to be caused in the end part of the liquid crystal display device where the thickness of the liquid crystal layer and the size of the pretilt angle change.

Though the alignment transition speed is accelerated by increasing of the pretilt angle, the practical dynamic range of the retardation ($\Delta$nd), expressed by the product of the refractive index anisotropy $\Delta$n and the thickness d of the liquid crystal layer (liquid crystal layer thickness), is reduced. Thus, the brightness is lowered. According to the present invention however, by setting the pretilt angle and the retardation within the above ranges, it is possible to attain the object to provide the liquid crystal display device capable of readily obtaining the bend alignment across the entire liquid crystal display panel of the liquid crystal display device, (i) with maintaining the brightness while maintaining the high speed responsiveness, the feature of the OCB mode, and (ii) without increasing the load on the activating driver.

Further, it is preferable that the liquid crystal display device in accordance with the present invention comprises a polymer layer on a boundary of each of the substrates and the liquid crystal layer, the polymer layer holding the liquid crystal molecules that are in contact with the polymer layer such that the liquid crystal molecules have pretilt angles of not less than 18° and not more than 36° when no voltage is applied.

By having the polymer layer, the liquid crystal display device can maintain the pretilt angle of the liquid crystal molecules within the range of not less than 18° and not more than 36°.

The polymer layer is formed up by, for example, polymerizing a polymerizable monomer added to the liquid crystal layer, the polymerization being performed while applying a voltage to the liquid crystal layer.

As described above, a state of the liquid crystal molecule in the liquid crystal layer is transited from the splay alignment to the bend alignment when the electric field is applied. As such, by polymerizing the polymerizable monomers added in the liquid crystal layer while applying the voltage to the liquid crystal layer, it is possible to cause the polymer layer to hold the liquid crystal molecules that are in contact with the liquid crystal layer such that the liquid crystal molecules have the large pretilt angle.

Further, it is preferable that the liquid crystal display device in accordance with the present invention is arranged such that the polymerizable monomer is a bifunctional monomer.

According to the invention, it is possible to form a planar polymer layer since the polymerizable monomers are the bifunctional monomers. Thus, it is possible to readily obtain a desired pretilt angle. In addition, since the polymer layer has a high rigidity, the pretilt angle is less likely to be changed along with deformation of the polymer layer.

Further, it is preferable that the liquid crystal display device in accordance with the present invention is arranged such that: the electric field applying section includes bilayer electrodes provided on different planes disposed with an insulation layer therebetween; of the bilayer electrodes, an electrode which is closer to the liquid crystal layer has an aperture on a part of a region where this bilayer electrode overlaps with another electrode via the insulation layer; and the bilayer electrodes have a difference in electric potentials.

According to the invention, since the electric field applying section has the above arrangement, a lateral electric field flows out from the aperture due to the difference in the electric potentials of the electrodes, causing a condition in which the bend alignment is energetically dominant. This causes the bend alignment to be more likely to be developed. Besides, since the electric field applying section has the above arrangement, it is possible to readily obtain a shape suitable for generating two different domains. In addition, according to the invention, a single pixel is not divided into two regions as in a case where different voltages are applied to the two electrodes on the single plane. Thus, the present invention is preferable in terms of the structure and driving.

Furthermore, it is preferable that the liquid crystal display device in accordance with the present invention is arranged such that the aperture has a shape having a flexion part.

According to the invention, the bend nucleus caused by the lateral electric field are more likely to be developed in the flexion part. Thus, it is possible to readily obtain the bend alignment.

Further, it is preferable that the liquid crystal display device in accordance with the present invention is arranged such that the aperture has at least one U-shaped flexion part.

If the aperture has the U-shaped vent, the domains do not interconnect to each other, thereby causing the bend nucleus to be more likely to be developed therebetween. Thus, in the case where the vent has the U-shape, development of the bend nucleus is facilitated, as compared to a case where, for example, the vent has a V-shape. In addition, when the aperture has the U-shaped flexion part, plural bend nuclei are more likely to be developed in a single aperture. Thus, it is possible to more readily obtain the bend alignment.

Furthermore, it is preferable that the liquid crystal display device in accordance with the present invention be arranged such that the insulation layer has a thickness of not more than 0.5 µm.

Thickness of the insulation layer is deeply related to an intensity of the divergence lateral electric field generated in the aperture. As the insulation layer becomes thicker, the intensity of the divergence lateral electric field to be generated becomes weaker. As such, what fraction of an applied voltage becomes the lateral electric field depends on the film thickness of the insulation layer. Then, a critical point of the thickness of the insulation layer is determined based on this fraction. For example, when the insulation layer has a thickness of 3 µm, the lateral electric field has an intensity of 2V/µm, whereas when the insulation layer has a thickness of 0.5 µm, the lateral field has an intensity of 4V/µm, which is two times larger than that in the former case. Empirically, a boundary value of the intensity of the lateral electric field necessary for developing the bend nucleus is approximately 4V/µm. Thus, it is preferable that the insulation layer has a thickness of not more than 0.5 µm. According to the invention, since the lateral electric field can be generated at a low voltage, it is possible to further reduce the load on the activating driver.

Furthermore, it is preferable that the liquid crystal display device in accordance with the present invention is arranged such that of the bilayer electrodes, the electrode which is closer to the liquid crystal layer side is a picture electrode, whereas the other electrode is an auxiliary capacitance electrode.

According to the invention, it is possible to readily form a lateral electric field generating structure without increasing a manufacturing step since, of the bilayer electrodes, the electrode which is closer to the liquid crystal layer side is the picture electrode, whereas the other electrode is the auxiliary capacitance electrode. Besides, since the liquid crystal display device has the auxiliary capacitance electrode, it is possible to stabilize an electric potential of the pixel. Thus, it is possible to further improve a display performance.

Furthermore, it is preferable that the liquid crystal display device in accordance with the present invention is arranged such that a structural object for forming a convex and a concave in the aperture is provided in the aperture.

According to the invention, the bend nucleus is more likely to be developed from the structural object, and the bend alignment is more likely to be developed from this bend nucleus. Thus, it is possible to further reliably obtain the bend alignment. In addition, the alignment transition to the bend alignment is more likely to be obtained by even a weak lateral electric field (divergence lateral electric field).

Furthermore, it is preferable that the liquid crystal display device in accordance with the present invention is arranged such that the structural object is a spacer.

According to the invention, since the structural object is the spacer, it is possible to readily provide the structural object for facilitating the development of the bend alignment, without increasing the manufacturing steps.

As described above, the liquid crystal display device in accordance with the present invention is arranged such that the molecule has the pretilt angle of not less than 18° and not more than 36°, the product Δnd of the refractive index anisotropy Δn and the thickness d of the liquid crystal layer is not less than 850 nm and not more than 1170 nm, and the electric field applying section for (i) applying the lateral electric field parallel to the substrate and (ii) bend-aligning the liquid crystal molecules is provided in the region corresponding to each of the pixels in the liquid crystal layer.

Development of the bend nucleus and splay-bend transition is deeply related to the size of the pretilt angle and the application of the lateral electric field. Since the liquid crystal display device in accordance with the present invention (i) has the electric field applying section that applying the lateral electric field and (ii) realizes the large pretilt, it is possible to realize the increase in the developmental rate of the bend alignment and the acceleration of the spreading speed of the bend alignment. Also, since the liquid crystal display device in accordance with the present invention (i) has the electric field applying section and (ii) realizes the large pretilt, it is possible to readily obtain the bend alignment across the entire liquid crystal display device encompassing the end part and the like where the alignment non-transition is more likely to be caused since the pixels are individually separated from each other.

Furthermore, though the brightness is lowered if the practical dynamic range of the retardation is reduced as the pretilt angle is simply increased, since the liquid crystal display device in accordance with the present invention has the retardation that is optimized, the brightness is lowered less significantly.

Thus, the present invention attains the object to readily obtain the bend alignment across the entire liquid crystal display panel of the liquid crystal display device, with maintaining the brightness while maintaining the high speed responsiveness, the feature of the OCB mode.

BRIEF DESCRIPTION OF DRAWINGS

FIG. 8 is a table for showing a generation status of the bend nucleus for each combination of (i) two different insulation layer thicknesses and (ii) two different vent shapes.

FIGS. 12(a) to 12(c) are micrographs that time-sequentially show the alignment transition caused by voltage application, in the order of the figures.

FIG. 14(a) is a cross-sectional view of the liquid crystal display panel, showing a method for realizing the large pretilt angle by forming the polymer layer in the liquid crystal cell having a COA structure.

FIG. 14(b) is a cross-sectional view of the liquid crystal display panel, showing the method for realizing the large pretilt angle by forming the polymer layer in the liquid crystal cell having the COA structure.

FIG. 14(c) is a cross-sectional view of the liquid crystal display panel, showing the method for realizing the large pretilt angle by forming the polymer layer in the liquid crystal cell having the COA structure.

BRIEF DESCRIPTION OF REFERENCE NUMERALS

Figure 1:
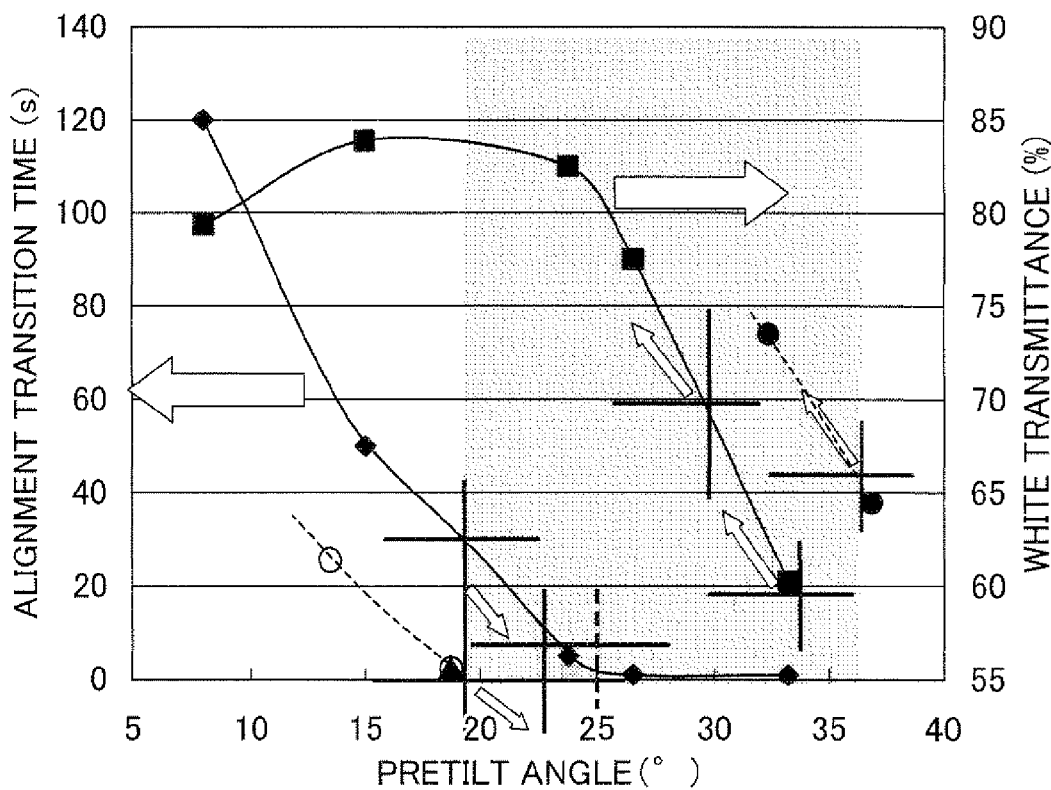
FIG. 1(a) is a graph for showing (i) a relation between a pretilt angle and an alignment transition time required for a splay-bend transition and (ii) a relation between a pretilt angle and a white transmittance, in a liquid crystal display device in accordance with an embodiment of the present invention.
FIG. 1(b) is a graph for showing (i) a relation between a retardation (Δnd) and a response time and (ii) a relation between a retardation (Δnd) and a white transmittance.
Figure 1:
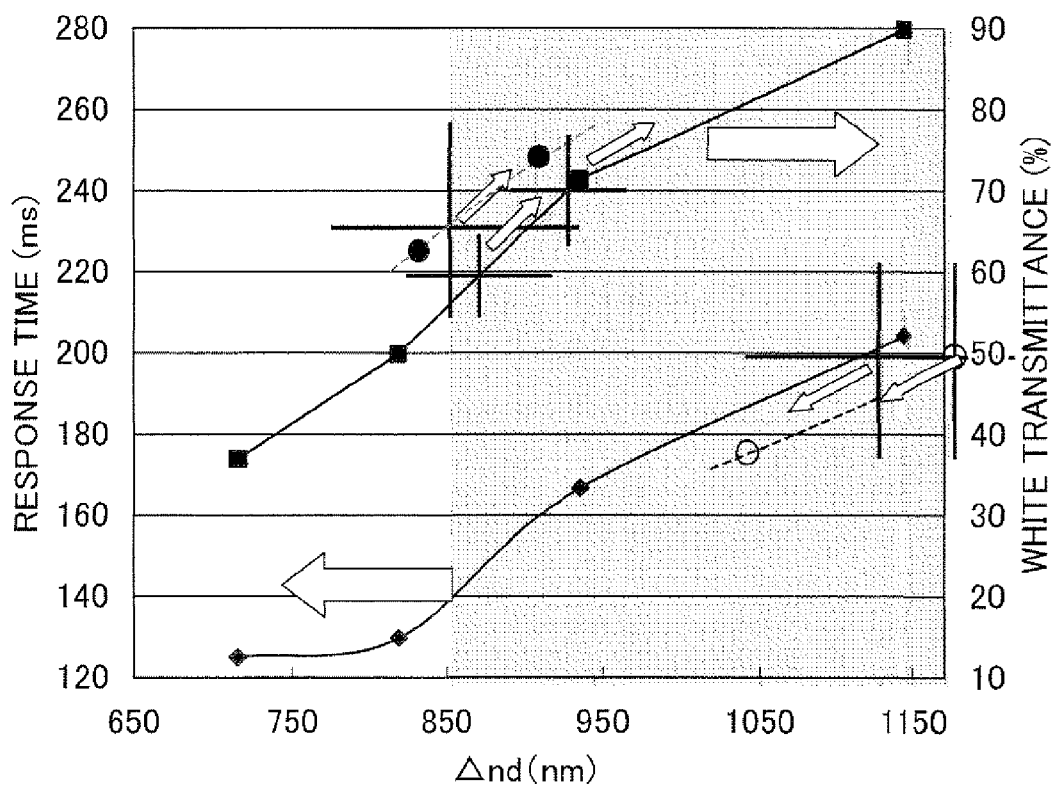

1 Liquid crystal display device
2A. First substrate
2B. Second substrate
3A. Color filter
3B. BM
4. Liquid crystal layer
4A. Liquid crystal molecule
5. Alignment film
6. Polymer layer
6A. Light polymerizable monomer
11. Transparent substrate
12. First electrode (electric field applying section)
13. Insulation layer
14. Second electrode (electric field applying section)
15. Transparent substrate
16. Common electrode
20. Bend alignment
21. Aperture (electric field applying section)
21A. Flexion part
22. Spacer
23. Bend nucleus
24. Divergence lateral electric field
31. TFT
31A. Gate electrode
31B. Source electrode
31C. Drain electrode
32. Picture electrode (electric field applying section)
33. Cs electrode (electric filed applying section)
40. Control circuit
41. Source driver
42. Gate driver
43. Gate line
44. Source line
50. Liquid crystal display panel
50A. Liquid crystal cell
51. Pixel
A Boundary
I Region
II Region
III Region

BEST MODE FOR CARRYING OUT THE INVENTION

Embodiment 1

One embodiment of a liquid crystal display device in accordance with the present invention is described as follows, with reference to the figures from FIGS. 1(a) through 1(b) to FIGS. 14(a) through 14(c)

Figure 2:
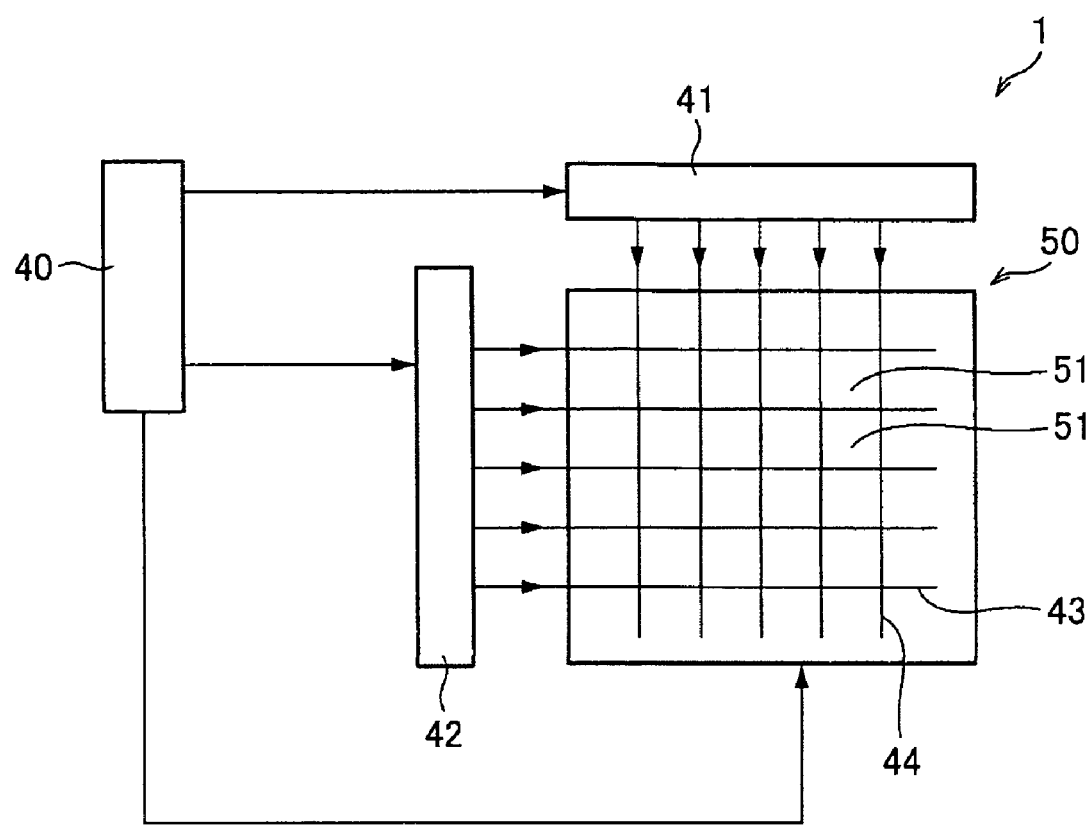
FIG. 2 is a block diagram for schematically illustrating a main arrangement in a liquid crystal display device in accordance with an embodiment of the present invention.
Figure 3:
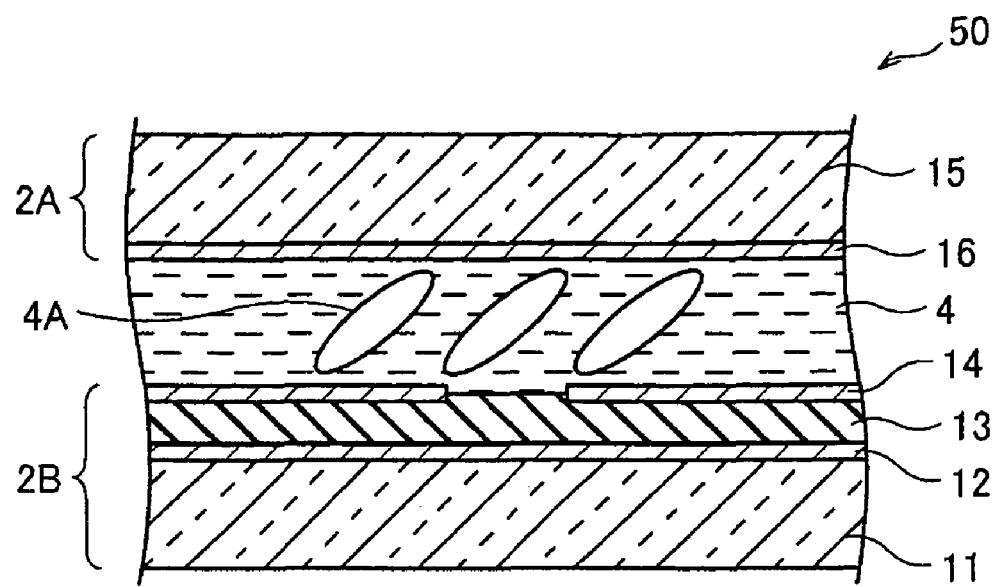
FIG. 3 is a cross-sectional view schematically illustrating a main arrangement in the liquid crystal display device of an embodiment in accordance with the present invention.
Figure 4:
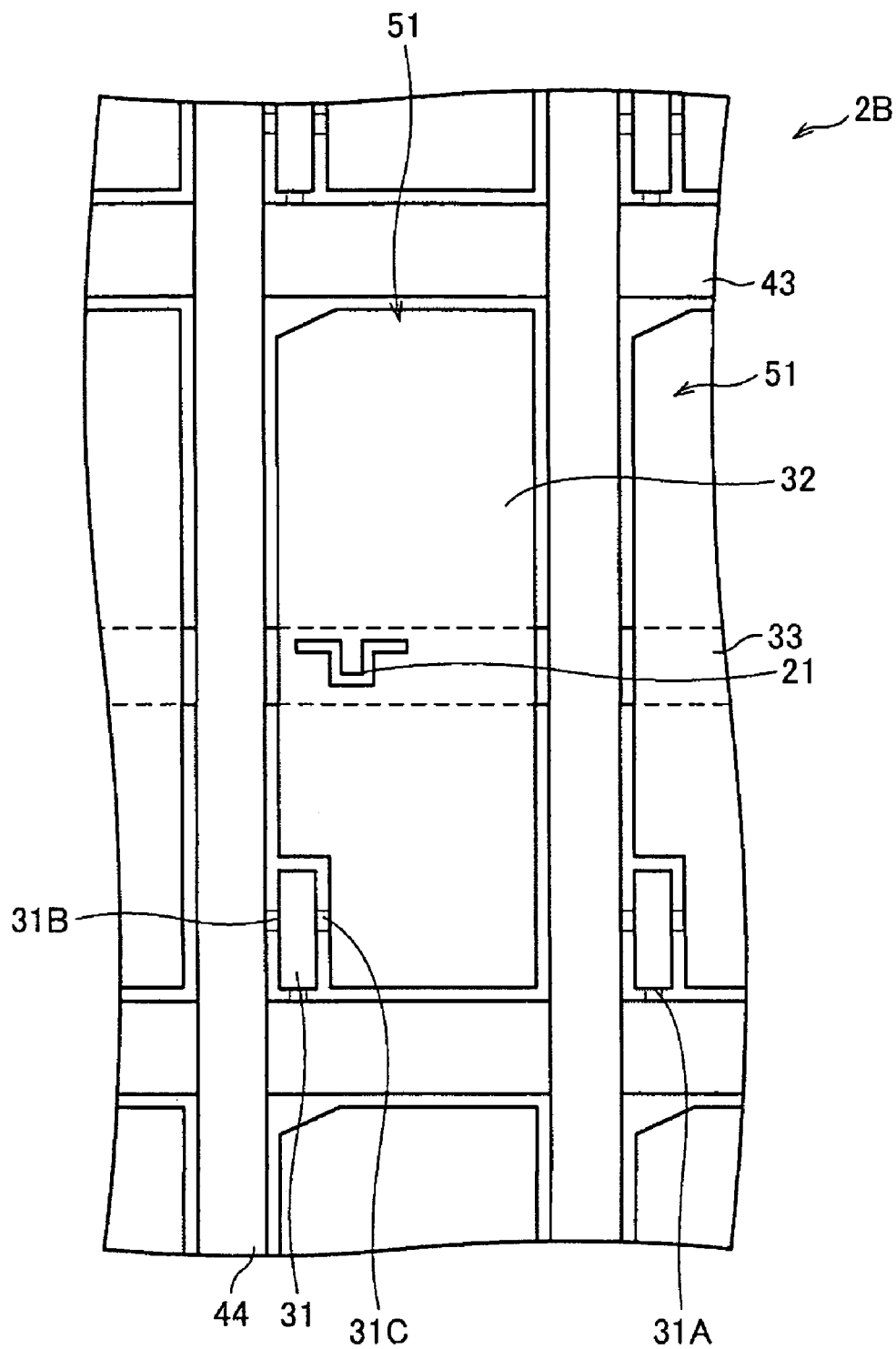
FIG. 4 is a plan view schematically illustrating a main arrangement of an electrode substrate in the liquid crystal display panel illustrated in the FIG. 3.

FIG. 2 is a block diagram schematically illustrating a main configuration of a liquid crystal display device in accordance with one embodiment of the present invention. FIG. 3 is a cross-sectional view schematically illustrating a main configuration of a liquid crystal display panel in the liquid crystal display device. FIG. 4 is a plan view schematically illustrating a main configuration of an electrode substrate in the liquid crystal display panel.

As illustrated in FIG. 2, a liquid crystal display device 1 in accordance with the present embodiment has a liquid crystal display panel 50, a control circuit 40, a source driver 41, and a gate driver 42.

On the liquid crystal display panel 50, pixels 51 are provided in a matrix pattern. Along rows and columns of the pixels 51, source lines 44 and gate lines 43 are provided so as to cross each other. The source lines 44 are connected to the source driver 41, and the gate lines 43 are connected to the gate driver 42, respectively. The source lines 44 and the gate line 43 are driven by the source driver 41 and the gate driver 42, respectively. The source driver 41 and the gate driver 42 are controlled by the control circuit 40, respectively.

As illustrated in FIG. 3, the liquid crystal display panel 50 has a first substrate 2A and a second substrate 2B, which are disposed so as to face each other. Between the substrates, a liquid crystal is sandwiched so as to form a liquid crystal layer 4.

Hereinafter, the present embodiment deals with a case where a CF (color filter) substrate is used as the first substrate 2A, whereas an array substrate is used as the second substrate 2B.

The first substrate 2A is formed from, for example, a color filter layer (not illustrated), an overcoat layer (not illustrated), a common electrode (counter electrode) 16 made of an ITO (Indium Tin Oxide) and the like, and an alignment film (not illustrated), each of which is formed on a transparent substrate 15 such as a glass substrate (transparent insulation substrate) in this order.

On the other hand, the second substrate 2B is formed from a first electrode 12, an insulation layer 13, a second electrode 14, and the alignment film (not illustrated), each of which is formed on a transparent substrate 11 in this order.

On outer sides (i.e., on surface sides opposite of the surfaces of the substrates facing each other) of the first and second substrates, a retardation film and a polarization plate, neither of which is illustrated, are provided, respectively.

With reference to FIG. 4, the following description provides detailed explanation on an arrangement of the second substrate 2B.

As illustrated in FIG. 4, the second substrate 2B has the gate lines 43 and the source lines 44 crossing each other, along the columns and rows of the pixels 51. On intersections of the gate lines 43 and the source lines 44, TFTs (thin-film transistors) 31 are provided as active elements, respectively.

The TFTs 31 are connected with the gate lines 43 at gate electrodes 31A and with the source lines 44 at source electrodes 31B. Drain electrodes 31C of the TFTs 31 are connected to picture electrodes 32 (display electrodes) as the second electrodes 14, through contact holes that are not illustrated. The picture electrodes 32 are made of ITO and the like.

Between the gate lines 43, a Cs electrode (auxiliary capacitance electrode) 33 is provided parallel to the gate lines 43, as the first electrode 12. The Cs electrode 33 and the gate lines 43 are formed on the single layer. By this, the picture electrodes 32 are formed on the Cs electrode 33 with an interlayer insulation film therebetween. The interlayer insulation film, which is not illustrated, corresponds to the insulation layer 13.

According to the liquid crystal display device 1, since the Cs electrode 33 is provided to the second substrate 2B formed of the array substrate (the TFT substrate), it is possible to compensate a leakage current that is caused when maintaining a drain electrode voltage caused by a shortage of an electric resistance value of the liquid crystal and by a shortage of an off-resistance value of the TFTs 31. Besides, it is also possible to hold to a minimum, an introduced voltage due to a gate-drain capacity that is caused when turning off a gate voltage. Thus, it is possible to stabilize electric potentials of the pixels.

The alignment film, which is not illustrated, is formed on the picture electrodes 32, as described above. That is, on the surfaces of the first substrate 2A and the second substrate 2B, there are formed the alignment films (horizontal alignment films, which are not illustrated), which are not illustrated, for splay-aligning liquid crystal molecules 4A (see FIG. 3) in the liquid crystal layer 4. The alignment films are prepared by aligning e.g., rubbing and the like, surfaces thereof so that the liquid crystal molecules 4A in the liquid crystal layer 4 can be aligned parallel to each other in the same direction.

In the liquid crystal display device 1, the liquid crystal molecules 4A are splay-aligned when no voltage is applied to the liquid crystal layer 4, whereas the alignment of the liquid crystal molecules 4A are transited to bend alignment (the splay-bend transition) when a voltage of a threshold level or higher is applied to the liquid crystal layer 4. Thus, an image display is performed.

The splay-bend transition can also be caused by applying a high voltage to the liquid crystal display panel 50 and/or using alignment changes caused by a convex structure. However, these methods cause the following problems, respectively. That is, a load on the activating driver is increased, and the effect thus obtained is not sufficient. Thus, neither of the methods is desirable.

As such, the liquid crystal display device 1 is arranged so that, as described in FIGS. 3 and 4, apertures 21 (holes formed by partially perforating the pixel electrodes 32) are provided as transition nucleus (bend nucleus) developing structures (lateral electric field generating structures), partially on a region where the pixel electrodes 32 (the second electrode 14) overlap with the Cs electrode 33 (the first electrode 12) via the interlayer insulation film (insulation film 13). This causes the transition nucleus (bend nucleus), an originating point of the alignment transition to the bend alignment, to be developed by applying the lateral electric field (divergence lateral electric field) flowing out from the apertures 21.

As the insulation layer 13, an SiN film having a thickness of 5000 Å is provided between the Cs electrode 33 and the picture electrodes 32. Each of the picture electrodes 32 has the holes, as the apertures 21, having a width of 5 μm. One of the apertures 21 has a U-shape (a convex and concave shape on a plan view) includes one or more flexion parts, as illustrated in FIG. 4. The Cs electrode 33 is a metal electrode made from a metal such as Al, whereas the picture electrodes 32 are formed of a transparent electrode made from a transparent material such as ITO.

Figure 5:
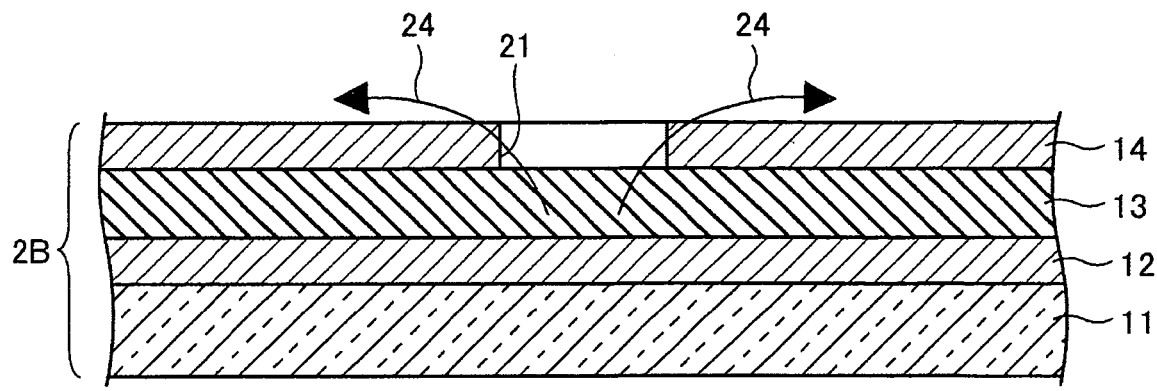
FIG. 5(a) is a cross-sectional view for schematically illustrating generation of a divergence lateral electric field, which is viewed from a cross-sectional surface of a part forming an aperture of a lateral electric field generating structure in the liquid crystal display panel illustrated in FIG. 3.
FIG. 5(b) is a plan view for schematically illustrating development of a bend nucleus in the part forming the aperture illustrated in FIG. 5(a).
Figure 5:
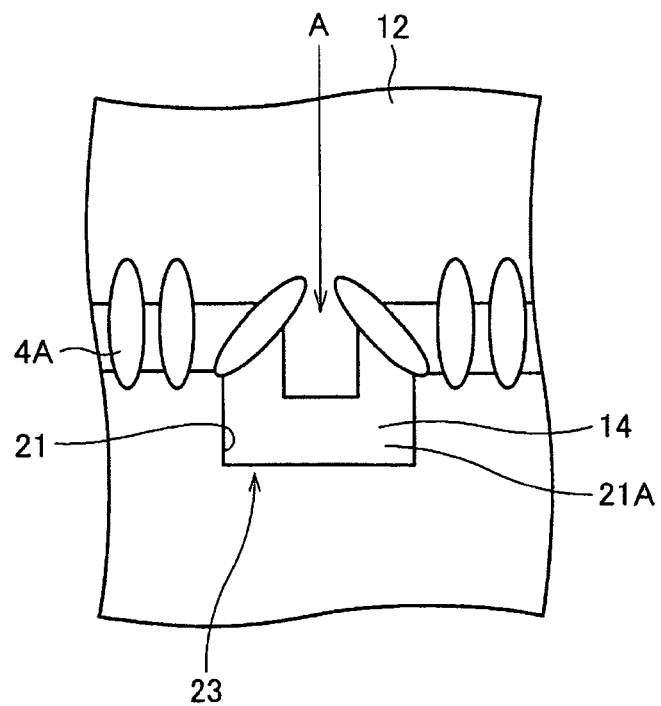

With reference to FIGS. 5(a) and 5(b), the following descriptions explain a principle of the bend nucleus development that is caused with use of the bend nucleus developing structure (the lateral electric field generating structure).

FIG. 5(a) is a cross-sectional view for schematically illustrating generation of the divergence lateral electric field, which is viewed from a cross-sectional surface of a part forming an aperture 21, one of the apertures 21 on the second substrate 2B. FIG. 5(b) is a plan view for schematically illustrating the development of the bend nucleus in the part forming the aperture 21.

In the present embodiment, a divergence lateral electric field 24 is used for developing the bend nucleus, as illustrated in FIG. 5(a). The divergence lateral electric field 24 is generated as follows. As described above, in the pixels 51, the aperture 21 is formed as the bend nucleus developing structure (bend forming structure), on the upper layer electrode (the second electrode 14) of the first electrode 12 and the second electrode 14 that are laminated via the insulation layer 13. This causes the electric field flowing out from the aperture 21 to have equipotential lines that are curved around the aperture 21 and thereby to have components parallel to the surfaces of the first substrate 2A and the second substrate 2B. By the thus generated divergence lateral electric field 24, plural kinds of domains, in which the liquid crystal molecules have different alignment, are generated in the liquid crystal layer 4. In a boundary A between the domains, the bend alignment is developed.

A mechanism of the bend alignment development has not been understood in detail. However, it should be mentioned that the following observation is known as an evidence of the bend alignment development. When the voltage is applied, a condition in which the bend alignment is energetically dominant is caused at a site (the boundary A) where two types of the domains, in particular, a left-twisted domain and a right twisted domain as illustrated in FIG. 5(b), interconnect with each other. This causes the bend alignment.

In the present embodiment, the Cs electrode 33 used as the first electrode 12 usually has the same electric potential as a common electrode 16, whereas the Cs electrode 33 basically has an electric potential different from that of the picture electrodes 32 (the second electrode 14) used as the display electrode. This causes the lateral electric field (the divergence lateral electric field 24) parallel to the surfaces of the substrates to be generated. However, it is more preferable that the Cs electrode 33 is independently driven. According to the present embodiment, it is possible to facilitate the splay-bend transition by developing the bend nucleus at higher efficiency, by increasing the difference in the electrical potentials of the Cs electrode and the picture electrode and/or by modulating cycles of the electric potentials.

Furthermore, shapes of the electrodes as well as an intensity of the electric field are important in reliably developing the bend nucleus by the lateral electric field so as to reliably obtain the bend alignment.

In the present embodiment, the electric field applying section for applying, to the liquid crystal layer 4, the lateral electric field parallel to the first substrate 2A and the second substrate 2B is not limited to the lateral electric field generating structure (the apertures 21) described above. Alternatively, various conventional methods can be adopted. However, when a method for applying different voltages to two electrodes on a single plane is adopted as a method for forming the lateral electric field, it becomes necessary to divide a single pixel into two regions. Thus, in terms of structure or driving, it is not preferable to adopt such a method. Besides, the lateral electric field to be generated in this case is not sufficient.

Furthermore, when a method for generating the lateral electric field between the picture electrode 32 and bus lines such as the source lines 44 and the gate lines 43 is adopted, it becomes difficult to obtain a shape suitable for generating two different domains. As such, a distance between the electrodes becomes widened. Thus, it is not possible to obtain the sufficient lateral electric field.

Thus, it is preferable to adopt the following method since the sufficient lateral electric field can be obtained in a simple arrangement: a method that (i) removes a part of the upper layer electrode in the pixels 51 where the electrodes have the two layers, e.g., remove the respective parts of the picture electrodes 32, which are the upper layer electrodes disposed on the Cs electrode 33, and (ii) uses the divergence lateral electric field 24 thereby flowing out due to the difference in the electric potentials between the picture electrodes 32 and the Cs electrode 33, which is the lower layer electrode.

Moreover, in a case where the lateral electric field (the divergence lateral electric field 24), generated with use of the bilayer electrodes having a laminated structure in which two electrodes are provided in different planes, is used, a thickness of the insulation layer 13 between the bilayer electrodes (between the picture electrodes 32 and the Cs electrode 33) is important in order for the bend alignment to be reliably obtained. If the insulation layer 13 is too thick, the intensity of the lateral electric field (the divergence lateral electric field 24) to be generated becomes weaker.

Figure 6:
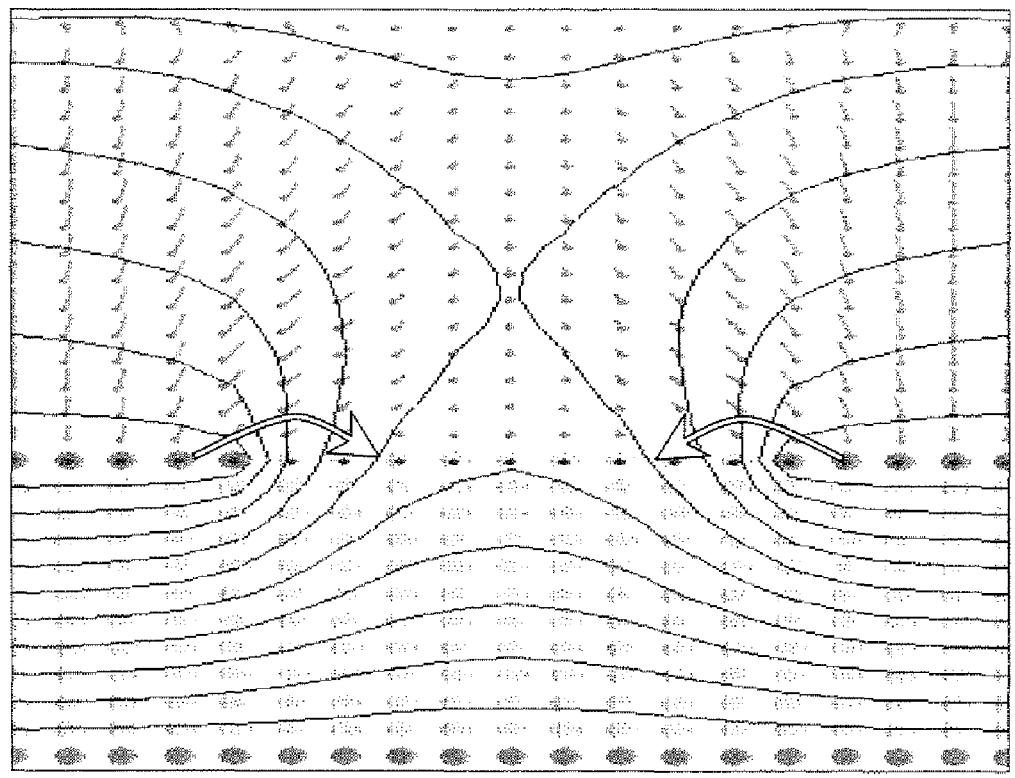
FIG. 6 shows, by a density of electric flux lines, an intensity of the electric field generated in the vicinity of the aperture of the lateral electric field generating structure, in a case where an insulation layer of the lateral electric field generating structure has a thickness of 3 μm.
Figure 7:
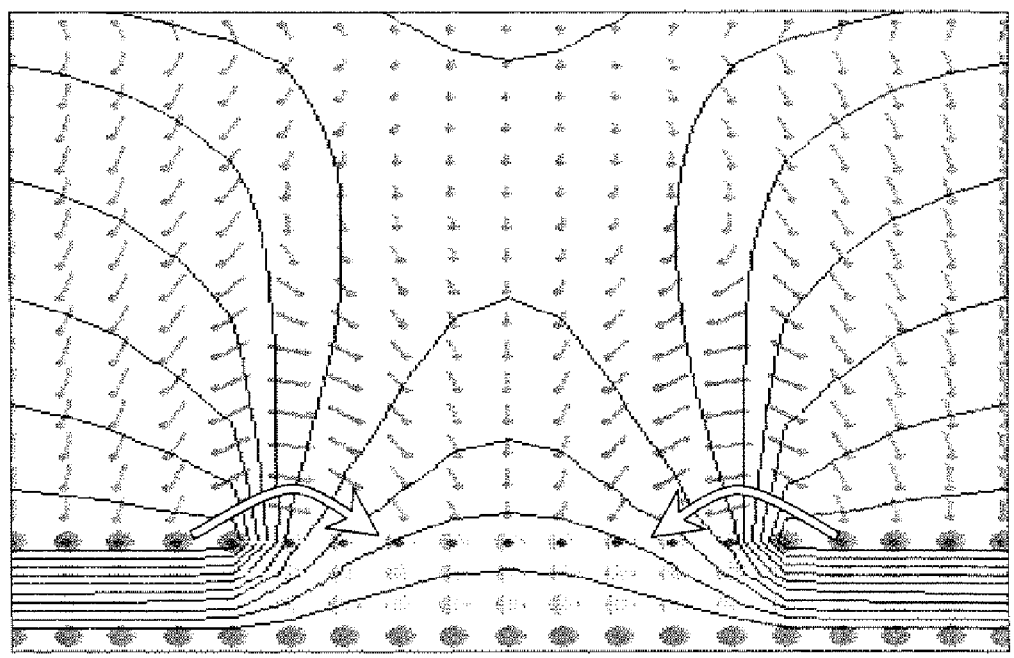
FIG. 7 shows, by a density of the electric flux lines, the intensity of the electric field generated in the vicinity of the aperture of the lateral electric field generating structure of the liquid crystal display device in accordance with the present invention, in a case where the insulation layer of the lateral electric field generating structure has a thickness of 0.3 μm.

Next, with reference to FIGS. 6 and 7, the following description explains a relation between the thickness of the insulation layer 13 and the intensity of the divergence lateral electric field 24.

FIGS. 6 and 7 show, by densities of the electric flux lines, the intensities of electric field generated in the vicinity of the aperture 21, respectively. FIGS. 6 and 7 show the intensities of the electric fields (the lateral electric field 24) generated when the voltages of 8V is applied between a picture electrode 32 as one of the picture electrodes 32 and the Cs electrode 33. FIG. 6 shows the intensity of the electric field generated in a case where the insulation layer 13 has a thickness of 3 µm, whereas FIG. 7 shows the intensity of the electric field generated in a case where the insulation layer 13 has a thickness of 0.3 µm. In FIGS. 6 and 7, an area around the lateral center corresponds to a part where the aperture 21 is formed. Arrows in FIGS. 6 and 7 indicate directions of the divergence lateral electric field 24 generated from end surfaces of the aperture 21. Here, the insulation layer 13 is made from the SiN.

As shown in FIGS. 6 and 7, the intensities of the lateral electric fields to be generated become weaker as the insulation layer becomes thicker. The intensities of the lateral electric fields generated is measured when the voltage of 8V is applied between the picture electrode 32 and the Cs electrode 33, with varying the thickness of the insulation layer. As a result it is found that the intensity of the lateral electric filed is 2V/µm in the case where the insulation layer 13 has a thickness of 3 µm, whereas the intensity of the lateral electric field is 4V/µm in the case where the insulation layer 13 has a thickness of 0.5 µm, which is two times larger. In the view of the bend nucleus development, the difference obtained is significant. As such, what fraction of the applied voltage becomes the lateral electric field depends on a film thickness of the insulation layer 13, and a critical point is determined based on this fraction. Usually, up to 8V of the applied voltage is applied to a target model of the liquid crystal display device. Thus, the applied voltage is set at 8V. Empirically, the critical point of the lateral electric field necessary for developing the bend nucleus is found to be approximately 4V/µm. Thus, it is preferable that the insulation layer 13 has a thickness of not more than 0.5 µm.

As seen from the comparison of FIGS. 6 and 7, a good lateral electric field is obtained when the insulation layer 13 has the thickness of not more than 0.5 µm, as in the case where the insulation layer 13 has the thickness of 0.3 µm.

In a case where, as described above, the bend alignment is developed by the lateral electric field (the divergence lateral electric field 24), the vent shape of the aperture 21 relates to the development of the bend nucleus.

Thus, with reference to FIG. 8, the following description explains a relation between the vent shape of the aperture 21 and the thickness of the insulation layer 13.

FIG. 8 is a table for showing a generation status for each combination of two thicknesses of the insulation layer 13 and two vent shapes.

First, when the insulation layer 13 has the thickness of 3 µm, no bend nucleus is developed regardless of the vent shapes.

When the insulation layer 13 has a thickness of 0.5 µm, though the bend nuclei are developed in both variations of the vent shapes, there is a difference in developmental rates. Here, the developmental rate of the bend nucleus refers to a ratio of the pixels 51, in which the bend nuclei are developed, to all the pixels 51 observed.

When the aperture 21 has a square vent shape, the bend nuclei are developed at a developmental ratio of not more than 50%. On the other hand, when the aperture 21 has a U-shaped vent shape (a convex and concave shape on a plan view) as described in FIG. 4, the bend nuclei are developed at a developmental ratio of not less than 50%.

From this result, it is thought to be preferable that the vent shape has at least one or more flexions.

That is, the vent shape of the aperture 21 is important in the reliable development of the bend alignment caused by the lateral electric field.

Figure 13:
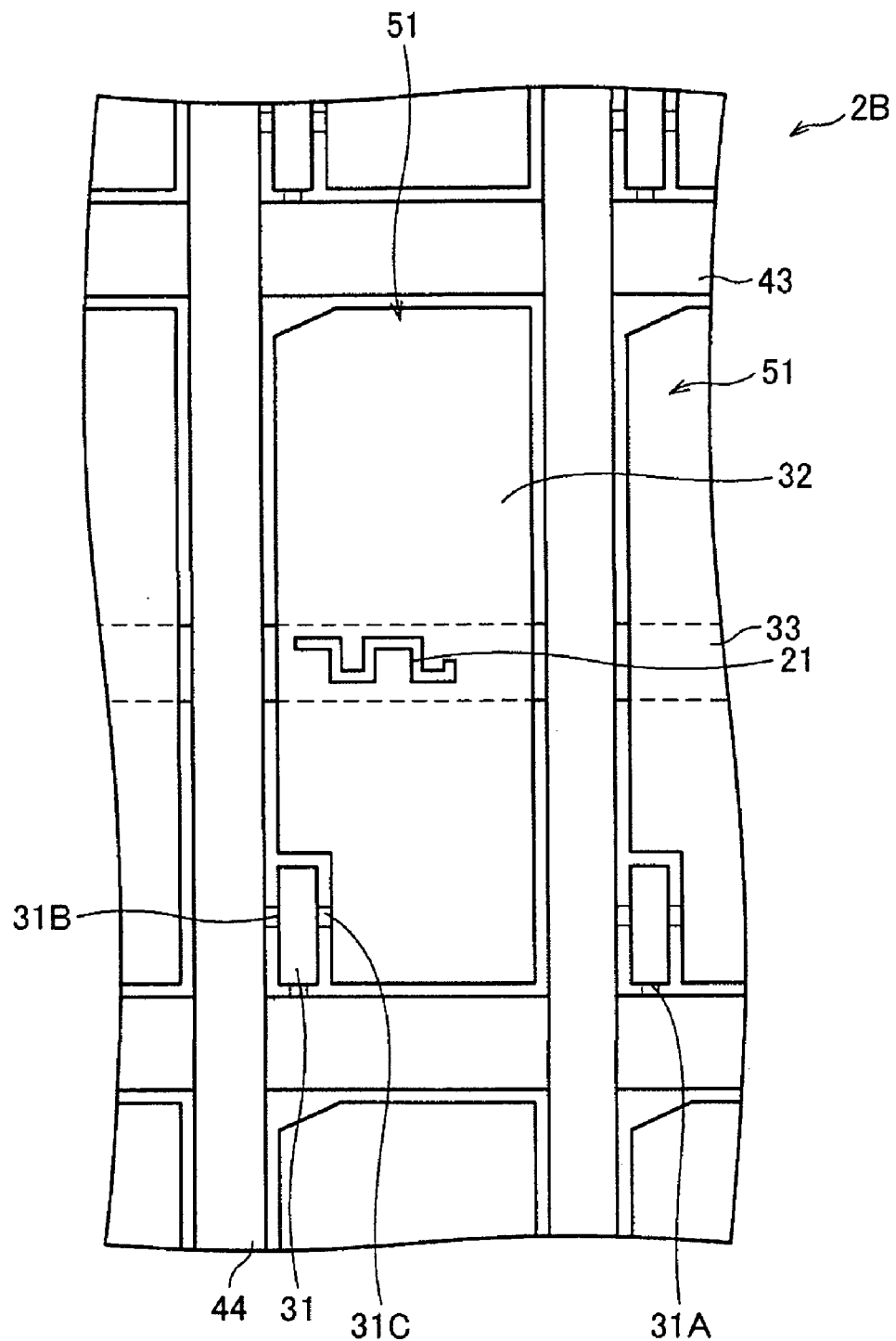
FIG. 13 is a plan view for illustrating a main arrangement of the electrode substrate of the liquid crystal display panel that has the lateral electric field generating structure having an aperture, a shape of which aperture is different from that illustrated in FIG. 4.

It is preferable that the aperture 21 has a vent shape that includes the U-shape, a shape having successive U-shaped flexions (successive U-shapes) as illustrated in FIG. 13, or a meandering flexion, on the picture electrode 32, the upper layer electrode. This is because the bend nuclei are more likely to be developed in flexions where the two kinds of domains are generated within a range close to each other, as illustrated in FIG. 5(b).

Figure 9:
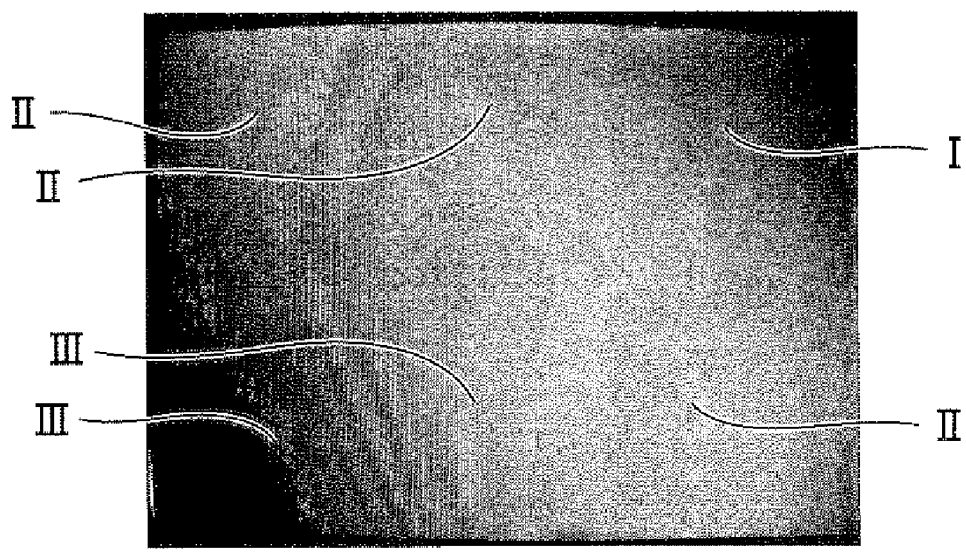
FIG. 9 is a micrograph showing alignment transitions to bend alignment, in a case where the following factors are varied, respectively: presence or absence of the lateral electric field generating structure and the vent shapes of the aperture

Next, with reference to FIG. 9, the following description explains differences in the alignment transitions to the bend alignment, which differences are caused due to whether the lateral electric field generating structure (the aperture 21) is provided in the liquid crystal display panel 50 or not and due to variations of the vent shapes in the liquid crystal display panel 50.

FIG. 9 is a micrograph for showing the alignment transitions to the bend alignment caused when the following factors are partially varied with respect to a panel surface of the liquid crystal display panel 50, respectively; presence or absence of the lateral electric field generating structure (the aperture 21) and the vent shape of the aperture 21.

In detail, a panel shown in FIG. 9 is divided into a total of six regions, that is, two divisions in a lengthwise direction and three divisions in a crosswise direction. The upper right region corresponds to a region (region I) where the lateral electric field generating structure (the aperture 21) is not formed. The upper left region, the upper center region, and the lower right region correspond to the regions (regions II) where, though the apertures 21 as the lateral electric field generating structures are formed, the vents do not have the preferable shapes. The lower left region and the lower center region correspond to regions (regions III) where the apertures 21 having the preferable vent shapes are formed as the lateral electric field generating structures, the above-mentioned vent shapes having the flexions arranged close to each other.

When electric voltages are applied to the six regions (regions I through III) under the same conditions, no bend nucleus is developed in the region I. Thus, no bend alignment is caused across the entire region I. In the regions II, though the bend nuclei are developed, sizes thereof are not large enough. Thus, while caused in a part of the region II, the bend alignment is not caused in the entire region II. In contrast, in the regions III, the bend nuclei are developed in the respective regions, and the bend alignment is caused across the entire regions III. It is known from the result that in order to develop the bend alignment, it is effective that the aperture 21 has the vent shape such as the U-shape or the meandering shape that has the flexions arranged close to each other, as described above.

Development of the bend nucleus and the transition to the bend alignment is also related to the size of the pretilt angle. If the pretilt angle is small, it is difficult to develop the bend nuclei in all the pixels 51. The bend nucleus alone cannot control the spreading speed of the bend alignment caused after the development of the bend nucleus.

Thus, in the present embodiment, the large pretilt angle is realized by using, as means for accelerating the spreading speed of the bend alignment, the polymer layer provided in the liquid crystal cell of the liquid crystal panel 50.

Next, with reference to FIGS. 10(a) through 10(d), the following description explains (i) a method for realizing the large pretilt angle by forming the polymer layer in the liquid crystal cell of the liquid crystal display panel 50 and (ii) a principle thereof.

FIGS. 10(a) through 10(d) are cross-sectional views for illustrating main arrangements of the liquid crystal display panel 50, showing the method for realizing the large pretilt angle by forming the polymer layer in the liquid cell of the liquid crystal display panel 50. FIGS. 10(a) through 10(d) schematically show the formation of the polymer layer, in a processing order.

Figure 10:
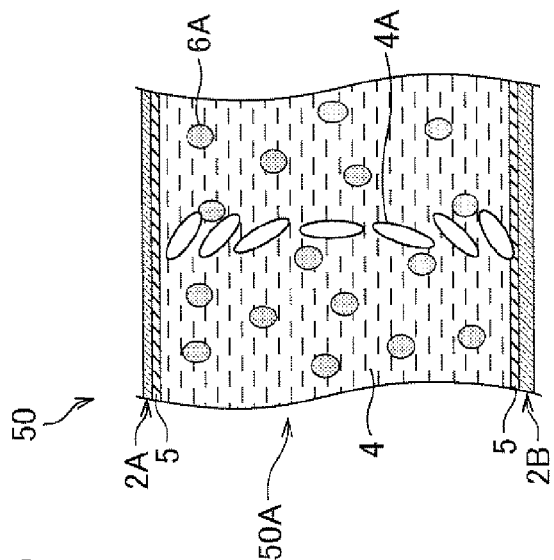
FIG. 10(a) is a cross-sectional view for illustrating the main configuration of the liquid crystal display panel, showing a method for realizing a large pretilt angle by forming a polymer layer in the liquid crystal cell.
FIG. 10(b) is a cross-sectional view for illustrating the main configuration of the liquid crystal display panel, showing the method for realizing the large pretilt angle by forming the polymer layer in the liquid crystal cell.
FIG. 10(c) is a cross-sectional view for illustrating the main configuration of the liquid crystal display panel, showing the method for realizing the large pretilt angle by forming the polymer layer in the liquid crystal cell.
FIG. 10(d) is a cross-sectional view for illustrating the main configuration of the liquid crystal display panel, showing the method for realizing the large pretilt angle by forming the polymer layer in the liquid crystal cell.
Figure 10:
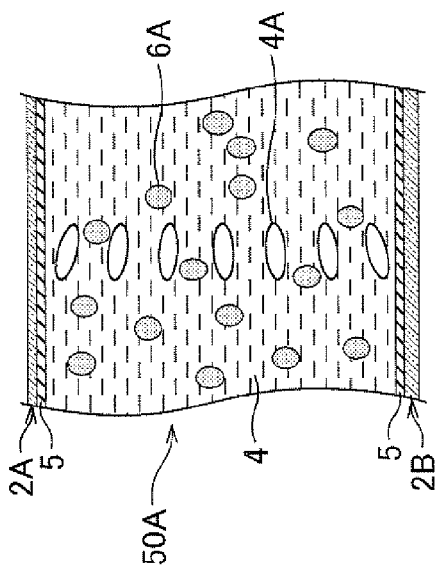
Figure 10:
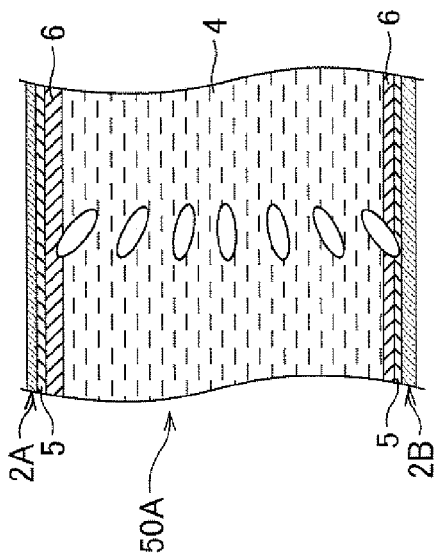
Figure 10:
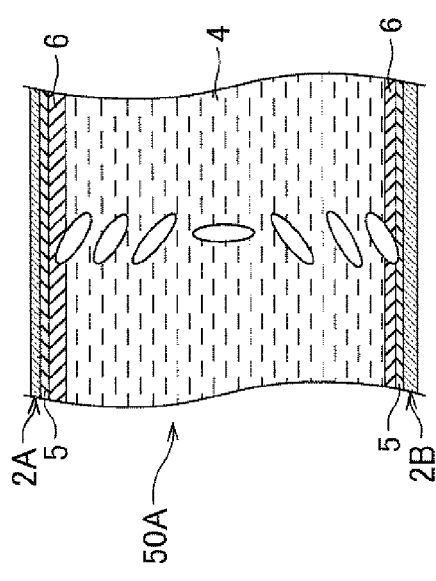

FIG. 10(a) shows a state in which neither light polymerization nor voltage application is performed with respect to a liquid crystal cell 50A of a liquid crystal display panel 50, which is filled up with a liquid crystal and a light polymerizable monomer 6A as a polymerizable monomer. FIG. 10(b) shows a state in which a voltage is applied to the liquid crystal display panel 50 shown in FIG. 10(a). FIG. 10(c) shows a state in which a polymer layer is formed, in the state shown in FIG. 10(b), by polymerizing the light polymerizable monomers added to the liquid crystal, while applying the voltage. FIG. 10(d) shows a state in which the application of the voltage is stopped after the liquid crystal display panel is irradiated with UV light.

As shown in FIGS. 10(a) through 10(d), on a first substrate 2A and a second substrate 2B, alignment layers 5 are formed on surfaces that face to the liquid crystal layer 4. After being formed on the surfaces of the substrates, the alignment layers 5 are rubbed by a conventional method, into a direction parallel to the first and second substrates 2A and 2B.

The polymerizable monomer added to the liquid crystal is not limited to a particular kind. A bifunctional monomer, in particular, light polymerizable monomers, is used suitably, in views of formation of a planar polymer and a rigidity of the polymer thus obtained. Particularly, a liquid crystal bifunctional monomer, having a structure in which two benzene rings are interconnected to each other, is more preferable as the polymerizable monomer, provided that the liquid crystal bifunctional monomer gives the rigidity to the polymerized polymer.

In addition, besides the bifunctional monomer, trifunctional or more monomers can be used as the polymerizable monomers so as to obtain higher responsiveness and the like. Example of such monomers encompasses TMTP (trimethylolpropane trimethacrylate) and the like.

However, a monofunctional polymerizable monomer is not preferable, provided that the monofunctional polymerizable monomer cannot form the planar polymer, and thereby causes a risk that a required pretilt is not obtained.

The liquid crystal is not limited to a particular kind. Thus, a conventional liquid crystal material can be used.

The following description explains, as an example, a case in which a P-type (positive) liquid crystal is used as the liquid crystal and a TMPT of a light polymerizable monomer is used as the polymerizable monomer. However, the present invention is not limited to this. In the present example, TMPT, a ratio of which to the P-type liquid crystal is more than 1.5 wt %, is added. In this case, a pretilt angle in the state shown in FIG. 10(a) is not more than 8°, whereas liquid crystal molecules 4A in the liquid crystal layer 4 are in a state of low pretilt splay alignment.

When a voltage (>Vcr) of more than a boundary voltage (Vcr) between the splay alignment and the bend alignment is applied to the liquid crystal cell 50A in this case, the splay-bend transition of the liquid crystal molecules 4A is caused, so that the liquid crystal molecules 4A incline more parallel to a thickness direction of the liquid crystal display panel 50, as illustrated in FIG. 10(b).

Then, in order that the liquid crystal molecules 4A having the large pretilt angle in the vicinity the polymer layer 6 may be fixed, the polymer layer 6 is formed on the alignment film 5 by polymerizing a light-polymerizable monomer 6A added to the liquid crystal, by irradiating the light-polymerizable monomer 6A with the UV light (ultraviolet light) while applying the voltage to the liquid crystal cell 50, as shown in FIG. 10(c). This causes the liquid crystal molecules 4A in the vicinity of the polymer layer 6 to be fixed to the polymer layer 6 so that the liquid crystal molecules 4A have the large pretilt angle, as in FIG. 10(b) where the voltage is applied.

As a result of this, as illustrated in FIG. 10(c), the liquid crystal molecules 4A in the vicinity of the polymer layer 6 are oriented with the large pretilt angle, whereas the liquid crystal molecules 4A disposed away from the polymer layer 6, disposed substantially in the middle of the thickness of the liquid crystal layer 4, are oriented such that angles of gradients of the liquid crystal molecules 4A gradually change from the vicinity of one substrate to the vicinity of the other substrate continuously in such a manner that the liquid crystal molecules 4A are oriented substantially parallel to a thickness direction in substantially the middle of the thickness direction of the liquid crystal display panel.

When the thus obtained pretilt angle of the liquid crystal molecules 4A of the liquid crystal panel 50 are measured, with stopping the application of the voltage, as illustrated in FIG. 10(d), the liquid crystal molecules 4A are in large pretilt splay alignment in which the pretilt angle is larger than 8°.

In the present embodiment, it is preferable to form the planar polymer so as to cause the liquid crystal molecules 4A to have the large pretilt angle and to fix the liquid crystal molecules 4A to the polymer layer 6, as described above. In the present embodiment, the method for concentrating the light-polymerizable monomer 6A in the vicinity of the alignment film 5 and forming the polymer layer 6 on the alignment film 5 is not particularly limited. For example, since the polymer layer 6 can be readily formed on the alignment film 5, it is effective to use a method for polymerizing the light polymerizable monomer 6A under a weak light source for a long time period (e.g., under a fluorescent light for 24 hours), in the liquid crystal display panel 50 to which the sufficiently high voltage (>Vcr) is applied.

Figure 11:
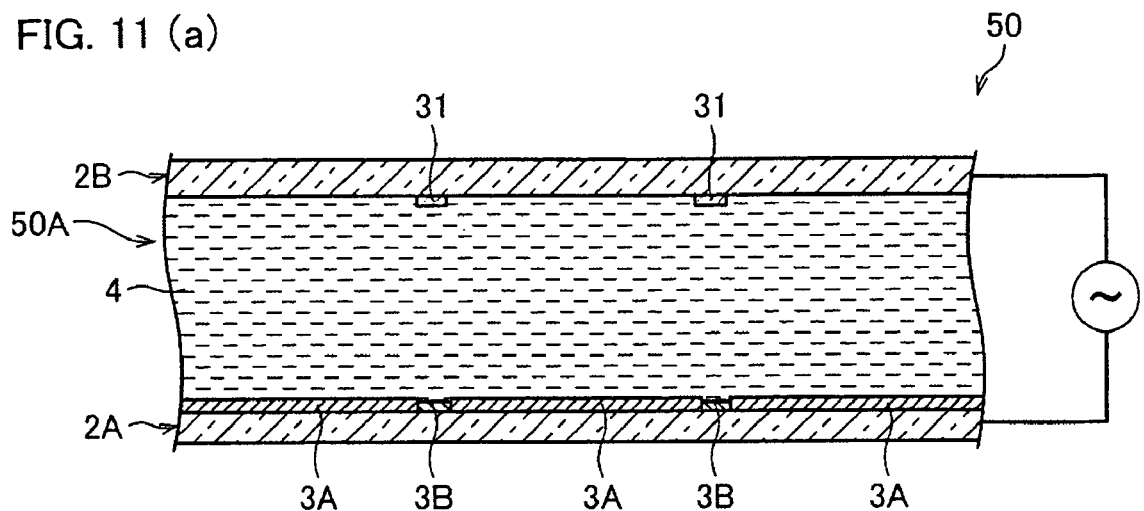
FIG. 11(a) is a cross-sectional view for illustrating the liquid crystal display panel, providing detail explanation on the method for realizing the large pretilt angle by forming the polymer layer in the liquid crystal cell of the liquid crystal display panel.
FIG. 11(b) is a cross-sectional view for illustrating the liquid crystal display panel, providing the detailed explanation on the method for realizing the large pretilt angle by forming the polymer layer in the liquid crystal cell of the liquid crystal display panel.
FIG. 11(c) is a cross-sectional view for illustrating the liquid crystal display panel, providing the detailed explanation on the method for realizing the large pretilt angle by forming the polymer layer in the liquid crystal cell of the liquid crystal display panel.
Figure 11:
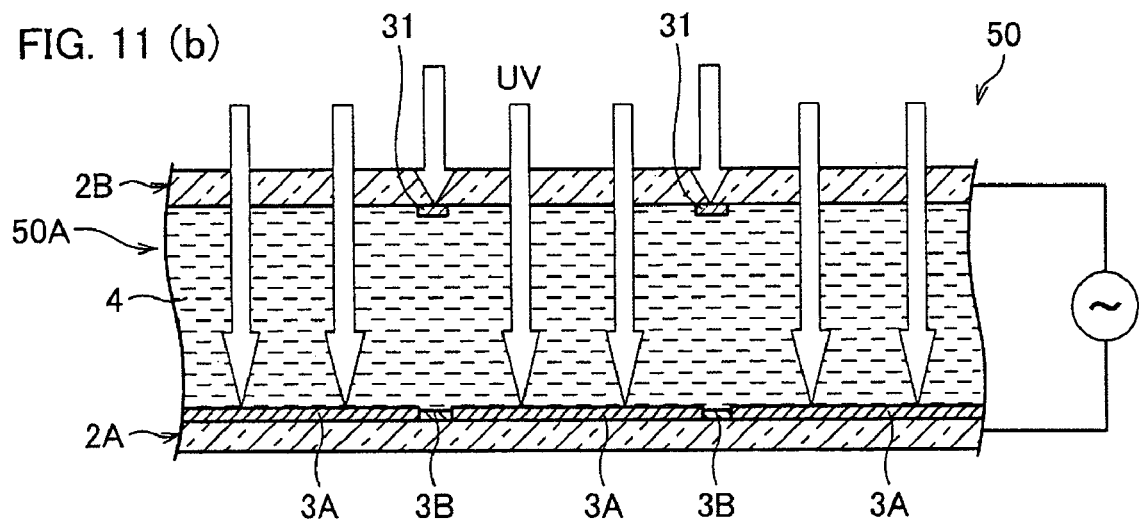
Figure 11:
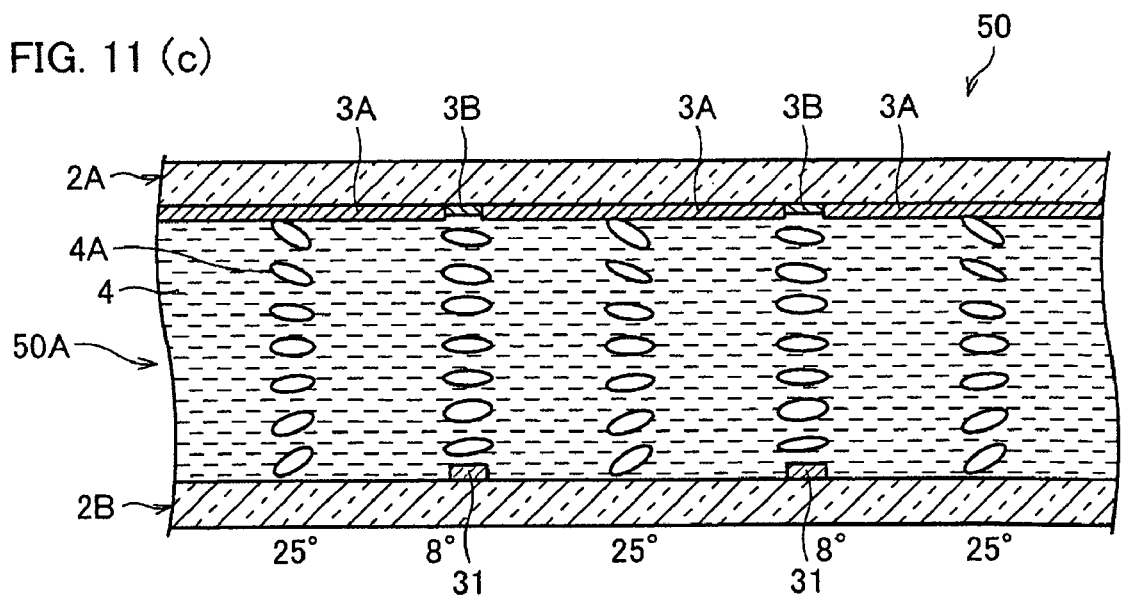

With reference to FIGS. 11(a) through 11(c), the following description provides specific explanation on an exemplary manufacturing method for manufacturing the liquid crystal display panel 50 with use of the above method, that is, a method realizing the large pretilt angle by forming the polymer through the UV irradiation.

FIGS. 11(a) through 11(c) are cross-sectional views of the liquid crystal display panel 50, specifically showing the method for realizing the large pretilt angle by forming the polymer layers in the liquid crystal cell 50A of the liquid crystal display panel 50. FIG. 11(a) schematically shows the application of the voltage to the liquid crystal display panel 50. FIG. 11(b) schematically shows the irradiation with the UV light to liquid crystal display panel 50. FIG. 11(c) schematically shows the alignment state of the liquid crystal molecules 4A in the liquid crystal display panel 50 thus obtained.

It is possible to adopt, as appropriate, a method used for manufacturing a conventional liquid crystal display panel in manufacturing the liquid crystal display panel 50 of the present embodiment. Thus, the following description mainly explains a difference between the method for manufacturing the liquid crystal display panel in accordance with the present embodiment and the method for manufacturing the conventional liquid crystal display panel.

First, a liquid crystal panel 50 not containing the liquid crystal molecules 4A is manufactured by the conventional method. Specifically, as illustrated in FIG. 11(a), first, color filters 3A are provided on the first substrate 2A so as to correspond to the pixels, and a common electrode, an alignment film, and the like, which are not illustrated, are formed so as to cover the color filters 3A. Between the color filters 3A, a BM (black matrix) 3B is provided. On a second substrate 2B, on the other hand, a TFT 31 is provided for each of the pixels, and a Cs electrode, an interlayer insulation film, a picture electrode, the alignment film, and the like are formed.

Next, after rubbing the alignment films formed on the first substrate 2A and the second substrates 2B in directions parallel to the substrates, the substrates are disposed to face each other, and the liquid crystal display panel 50 not containing the liquid crystal is constructed by the conventional method. In the present embodiment, the substrates are disposed to face each other so that a cell thickness, i.e., an empty space (liquid crystal layer thickness d) between the substrates, is 7 μm.

Then, a mixture of a liquid crystal and a polymerizable monomer is prepared as a pre-polymerized mixture material to be filled in the liquid crystal display panel 50. In the present embodiment, the pre-polymerized material is prepared by adding the bifunctional light polymerizable monomers of 0.5 wt % to the positive (P) type liquid crystal having the refractive index anisotropy Δn of 0.13.

Subsequently, after filling up the liquid crystal panel 50 with the pre-polymerized material by the conventional method, an alternating voltage (AC) of 20V (60 Hz), higher than the boundary voltage (Vcr), is applied to the entire liquid crystal display panel 50 so as to align, in a thickness direction of the liquid crystal display panel 50, the liquid crystal molecules 4A in the liquid crystal layer 4 of the liquid crystal display panel 50.

After that, as shown in FIG. 11(b), the light polymerizable monomers 6A are polymerized by irradiating the liquid crystal display panel 50 with the UV light, while applying the voltage. In the present embodiment, the irradiation with the UV light is performed two times: a first irradiation and a second irradiation.

First, in the first irradiation, an entire surface of the liquid crystal display panel 50 is irradiated with UV light (365 nm) by 10 J/cm$^2$, with use of an extra high pressure mercury lamp as a light source. As shown in FIG. 11(b), the UV irradiation is performed from the second substrate 2B, not from the first substrate 2A, since the UV light cannot pass the color filters 3A. By the UV irradiation under the above condition, pretilt angles become 25°.

Then, the second irradiation is performed. The second irradiation is performed in order to reduce an amount of a residual polymerizable monomer in the pre-polymerized mixture material approximately to 0%.

Specifically, since the UV light cannot pass a part of the second substrate 2B on which the bus lines such as the gate lines 43 and the source lines 44, neither of which are illustrated, as well as the TFTs 31 are formed, there may remains the pre-polymerized mixture material, which is not irradiate with the UV light. Thus, in order to polymerize the residual polymerizable monomers not having been polymerized by the first irradiation, the second irradiation is performed. Specifically, the liquid crystal panel 50 is left under an ordinary fluorescence light for 24 hours, without applying the voltage. By the second irradiation, the amount of the residual polymerizable monomers is reduced approximately to 0%.

By the above processes, the liquid crystal display panel 50 of the present embodiment can be obtained.

As shown in FIG. 11(c), the liquid crystal molecules 4A of the liquid crystal display panel 50 thus obtained have a pretilt angle of 25° in the parts where (i) the color filters 3A are formed on the first substrate 2A and (ii) no TFT 31 is formed on the second substrate 2B. On the other hand, the liquid crystal molecules 4A have a pretilt angle of 8° in the parts where (i) the BMs 3B are formed on the first substrate 2A and (ii) the TFTs 31 are formed on the second substrate 2B.

As such, according to the present embodiment, it is possible to realize the large pretilt angle by polymerizing the light polymerizable monomers added to the liquid crystal, while applying the sufficiently high voltage (>Vcr) to the liquid crystal display panel 50.

As they have larger pretilt angle, the liquid crystal molecules 4A are more likely to be bend-oriented than to be splay-oriented, at the time of the voltage application. As such, forming the polymer layer 6 (see FIG. 10(d)) in the liquid crystal cell 50A allows the parts forming the polymer layer 6 to facilitate the bend-splay transition smoothly in the liquid crystal molecules 4A, at a low voltage. However, while the alignment transition speed is accelerated by realizing the large pretilt angle, the practical dynamic range of the retardation ($\Delta n \cdot d$; hereinafter, simply referred to as "$\Delta nd$"), expressed by the refractive index anisotropy $\Delta n \times$ the liquid crystal thickness d, is reduced, thereby causing the brightness to be lowered.

Thus, it is important to increase the retardation $\Delta nd$ in the liquid crystal layer 4 in order to prevent the lowering of the brightness due to the decrease in $\Delta nd$ that is caused by the large pretilt angle.

As such, the following description explains a result of study in which a retardation size large enough to maintain the brightness while maintaining the high speed responsiveness, the feature of the OCB mode, was examined from relations in (i) an alignment transition time required for the splay-bend transition, (ii) a pretilt angle and (iii) a white transmittance as well as from relations in (i) a response time, (ii) a retardation ($\Delta nd$), and (iii) a white transmittance.

FIGS. 1(*a*) and 1(*b*) show the results measuring the relations in (i) the alignment transition time required for the splay-bend transition, (ii) the pretilt angle, and (iii) the white transmittance, and the relation in (i) the response time, (ii) the retardation ($\Delta nd$), and (iii) the white transmittance, respectively.

FIG. 1(*a*) is a graph showing a relation between the pretilt angle (the horizontal axis) and the alignment transition time (the left vertical axis) as well as a relation between the pretilt angle (the horizontal axis) and the white transmittance (the right vertical axis). FIG. 1(*b*) is a graph showing a relation between $\Delta nd$ (the horizontal axis) and the response time (the left vertical axis) as well as a relation between $\Delta nd$ (the horizontal axis) and the white transmittance (the right vertical axis).

The alignment transition time shows a time period during which the bend orientation is obtained in the entire liquid crystal display panel 50, while a direct voltage (DV) of 25V is applied to the entire liquid crystal display panel 50. The white transmittance shows a transmittance relative to a transmittance of two polarizers, which is set as 100%, having absorption axes that are aligned to each other. In a process of calculating a white brightness, a calculation is performed, with arranging a contrast to be calculatingly maximum.

In FIG. 1(*a*), "♦" indicates a pretilt angle dependency of the alignment transition time at $-30°$ C., whereas "■" indicates a pretilt angle dependency of the white transmittance at $-30°$ C., in a case of a liquid crystal display panel (i) using a current liquid crystal material suitable for the OCB mode and (ii) fixing the cell thickness (the liquid crystal layer thickness d) to 8.1 µm and the retardation ($\Delta nd$) to 1050 nm.

In FIG. 1(*b*), "♦" indicates a response time at $-30°$ C., whereas "■" indicates a white transmittance at $-30°$ C., in a case where a retardation ($\Delta nd$) of a liquid crystal layer is varied in a liquid crystal display panel (i) using the current liquid crystal material suitable for the OCB mode and (ii) having a cell thickness (the liquid crystal layer thickness) of 8.5 µm and a pretilt angle of 25°.

The results indicated by "♦" and "■" in FIGS. 1(*a*) and 1(*b*) are the results measured in a liquid crystal display panel not having the lateral electric field generating structure (aperture 21) on picture electrode 32.

In order to show an improving effect of the alignment transition of a case where the use of the lateral electric field applying structure (the aperture 21) is combined with the use of the polymer layer 6 realizing the large pretilt angle, a pretilt angle dependency of the alignment transition time at $-30°$ C. is measured in a liquid crystal display panel having the same configuration as the liquid crystal display panel used above except for that it has a lateral electric field generating structure (aperture 21). That is, the pretilt angle dependency of the alignment transition time at $-30°$ C. is measured, with using, in the liquid crystal display panel 50 provided with the lateral electric field generating structure (aperture 21) shown in FIG. 4, the same liquid crystal material as used in the measurement of the pretilt angle dependency of the alignment transition time indicated by "♦" in FIG. 1(*a*). A result is indicated by "▲" in FIG. 1(*a*).

The following is known from FIG. 1(*a*). When the pretilt angle is 20°, the alignment transition time takes more than 20 seconds, as indicated by "♦," in the liquid crystal display panel 50 in which no lateral electric field generating structure (aperture 21) is formed. In contrast, the alignment transition time is reduced to be less than 5 seconds, as indicated by "▲," in the liquid crystal display panel 50 in which the lateral electric field generating structure (aperture 21) is formed.

Thus, the responsiveness and the brightness of the liquid crystal display panel 50 are varied, depending on the conditions such as the presence or absence of the lateral electric field generating structure (aperture 21) as well as the size of the pretilt angle and the magnitude of the retardation ($\Delta nd$), which are, in particular, a kind of liquid crystal material to be used and the like, for example.

Then, the display performance is measured with varying the above conditions within a range usable as the OCB mode liquid crystal display device, and then the pretilt angle dependency of the alignment transition time at $-30°$ C. and the pretilt angle dependency of the white transmittance at $-30°$ C. are re-measured and calculated in the condition (a liquid crystal material) in which the most suitable feature can be obtained. In FIG. 1(*a*), "○" and "●" indicate the pretilt angle dependency of the alignment transition time and the pretilt angle dependency of the white transmittance, respectively, in the liquid crystal display panel 50 having the cell thickness (liquid crystal layer thickness d) of 8.1 µm and the retardation ($\Delta nd$) of 1050 nm.

Similarly, the display performance is measured, with varying the conditions within the range usable as the liquid crystal display device of the OCB mode, and then the retardation ($\Delta nd$) dependency of the response time at $-30°$ C. and the retardation ($\Delta nd$) dependency of the white transmittance at $-30°$ C. are re-measured and calculated in the condition (the liquid crystal material) in which the most suitable feature can be obtained. In FIG. 1(*b*), "○" and "●" indicate the retardation ($\Delta nd$) dependency of the response time at $-30°$ C. and the retardation ($\Delta nd$) dependency of the white transmittance at $-30°$ C., respectively, in a liquid crystal display panel 50 having a cell thickness (a liquid crystal layer thickness) of 8.5 µm and a pretilt angle of 25°.

Taking account of the performance under the circumstance at $-30°$ C., it is assumed that the alignment transition time required in the OCB mode liquid crystal display device should be less than a target value of 1 s.

Then, it is known from the relation between the pretilt angle and the alignment transition time that, in order for the above requirements to be met, the pretilt angle indicated by "♦" is more than 27°, whereas the pretilt angle indicated by "○" is more than 18°.

The white transmittance required in the OCB mode liquid crystal display device corresponds to 70% of a transmittance (a transmittance assumed to correspond to 95% of a transmittance of parallel polarizers) in an ordinary, TN (Twisted Nematic) mode liquid crystal display device. The white transmittance is thought to have a lower limit corresponding to 66%, which is assumed to be a lower limit in a mode using birefringence, of the transmittance in the ordinary, TN mode liquid crystal display device.

It is known from a relation between the pretilt angle and the white transmittance that, in order for the above requirements to be met, the pretilt angle indicated by "■" is 33° or less, whereas the pretilt angle indicated by "●" is 36° or less.

As a result of calculating, as described above, the pretilt angle necessary for the alignment transition time at −30° C. and the white transmittance at −30° C. to be in the above range, with varying properties (an anisotropy of dielectric constant and a modulus of elasticity) of the liquid crystal material within the range usable for the OCB mode, it can be said that the pretilt angle in an approximate range of 18° or more and 36° or less is preferable in the OCB mode liquid crystal display device using the bend alignment, though there are slight variations due to liquid crystal materials and/or configurations of the liquid crystal display panel. In this range, the requirements for the properties usable as the liquid crystal materials that are for obtaining the bend alignment, as described above, are substantially satisfied.

Next, with reference to FIG. 1(b), the following description explains the retardation ($\Delta$nd). In order not to lower the white transmittance, it is preferable to increase $\Delta$nd (e.g., a liquid crystal layer thickness is increased). However, since increasing the $\Delta$nd simultaneously causes deterioration (delay in the response time) in the response feature, the $\Delta$nd cannot be increased to a large extent.

As described above, the white transmittance required in the OCB mode liquid crystal display device has the lower limit corresponding to 66% of the transmittance in the TN mode liquid crystal display device.

It is known from a relation between $\Delta$nd and the white transmittance that, in order for the requirements to be met, the $\Delta$nd indicated by "■" is 910 nm or more, whereas $\Delta$nd indicated by "●" is 850 nm or more.

The upper limit of the response time required in the OCB mode liquid crystal device is set at 200 ms, without the consideration of the brightness and the like, which is a maximum speed in the TN mode liquid crystal display device at −30° C.

It is known from a relation between $\Delta$nd and the response speed that, in order for the requirements to be met, $\Delta$nd indicated by "♦" is 1110 or less, whereas $\Delta$nd indicated by "○" is 1170 nm or less.

As in the case of calculating the pretilt angle, as a result of calculating the retardation ($\Delta$nd) necessary for the response speed at −30° C. and the white transmittance at −30° C. to be in the above range, with varying properties (the anisotropy of dielectric constant and the modulus of elasticity) of the liquid crystal within the range usable in the OCB mode, it can be said that the $\Delta$nd in an approximate range of 850 nm or more and 1170 nm or less is preferable in the OCB mode liquid crystal display device using the bend alignment, though there are slight variations due to the liquid crystal materials and the configurations of the liquid crystal display panels. In this range, the requirements for the properties usable as the liquid crystal materials that are for obtaining the bend alignment are substantially satisfied.

As described above, according to the present embodiment, it is possible to simultaneously realize the increase in the developmental rate of the bend alignment and the acceleration of the spreading speed of the bend alignment by (i) setting $\Delta$nd of the liquid crystal layer 4 large and (ii) providing each of the pixels 51 with the lateral electric field generating structure for developing the bend nucleus in order to prevent the lowering of the brightness that is caused due to the decrease in $\Delta$nd by the large pretilt angle. Thus, according to the present embodiment, it is possible to readily obtain the bend alignment across the entire liquid crystal display panel 50, (i) with maintaining the brightness while maintaining the high speed responsiveness, the feature of the OCB mode, and (ii) without increasing the load on the activating driver.

In particular, as described above, the alignment transition is facilitated by realizing the large pretilt angle with the use of the polymer formation, for example. However, since the pixels 51 are independently separated from each other, the bend alignment does not spread to some of the pixels 51 in which the bend nuclei are not developed, thereby causing the splay alignment to remain therein. Such an alignment non-transition is more likely to be caused in the end parts of the liquid crystal display panel 50, in particular, where the cell thicknesses and the pretilt angles vary. As such, by (i) providing the pixels 51 with the lateral electric field generating structures, respectively, as in the liquid crystal display panel 50 in accordance with the present embodiment, and thereby (ii) causing the bend nucleus, from which the bend alignment is developed, to be developed in each of the pixels 51, it is possible to cause the alignment transition in all the pixels 51 more completely.

Then, with reference to FIGS. 12(a) through 12(c), the following description explains the alignment transition from the splay alignment to the bend alignment in the liquid crystal display panel 50 in accordance with the present embodiment, which alignment transition begins at the bend nucleus.

FIGS. 12(a) through 12(c) are micrographs that time-sequentially show the alignment transition caused by the voltage application, in an order of FIG. 12(a), FIG. 12(b), and FIG. 12(c).

Requirements for the voltage application are as follows. On setting an electric potential of a common electrode 16 as a ground (GND), an alternating voltage (AC) of 10V (60 Hz) is applied to the picture electrode 32 such that a Cs electrode 33 and the picture electrode 32 have electric potentials opposite to each other. The liquid crystal display panel 50 used has a pretilt angle of 25°. An environmental temperature is set at −30° C. As illustrated in FIGS. 12(a) through (c), the aperture 21 has a vent shape that appears a U-shape on a plan view, as in the case of FIG. 4.

First, as shown in FIG. 12(a), the bend nucleus 23 is developed, by the voltage application, in the flexion 21A of the aperture 21. As time advances, the alignment transition from the splay alignment to the bend alignment 20 is caused from the bend nucleus 23, as shown in FIGS. 12(b) and 12(c). In the present embodiment, it is confirmed that the alignment transition from the splay alignment to the bend alignment 20 is caused in substantially the entire region of the liquid crystal display panel 50 within 5 seconds.

As such, the following is known: according to the present embodiment, since the effective lateral electric field (the divergence lateral electric field 24) is applied to the liquid crystal layer 4 in which the large pretilt angle is realized, the bend nucleus 23 is always developed in the flexion part 21A of the aperture 21, and the alignment transition from the splay alignment to the bend alignment is caused at a high efficiency from the bend nucleus 23, even when the environmental temperature is low, as described above. In addition, it is also known that since the display performance such as the high speed responsiveness, the brightness, and the contrast are maintained in the above requirements, as described above, it is possible to realize the broadening of a developing area (the bend nucleus 23) of the bend alignment 20 and the acceleration of the spreading speed of the bend alignment 20, while maintaining such display performance.

The present embodiment deals with the case where the color filters 3A are formed on the first substrate 2A, as mainly shown in FIGS. 11(a) through 11(c). However, the substrate on which the color filters 3 are formed is not limited to the first substrate 2A. Alternatively, the liquid crystal display panel 50 can be arranged in a COA (Color-filter On Array) structure in which, as shown in FIGS. 14(a) through 14(c), the color filters 3A and the TFTs 31 are formed on the second substrate 2B.

FIGS. 14(a) through 14(c) are cross-sectional views illustrating the liquid crystal display panel 50, providing specific explanation on a method for realizing the large pretilt angle by forming the polymer layer in the liquid crystal cell 50A of the liquid crystal display panel 50 having the COA structure. FIG. 14(a) schematically shows the voltage application to the liquid crystal display panel 50. FIG. 14(b) schematically shows irradiation with the UV light to the liquid crystal display panel 50. FIG. 14(c) schematically shows the alignment states of the liquid crystal molecules 4A in the thus obtained liquid crystal display panel 50.

In the liquid crystal display panel 50 having the COA structure, the TFT 31 and the color filter 3A are formed in each of the pixels on the second substrate 2B, as illustrated in FIG. 14(a) through 14(c).

When the COA structure is adopted, there is absolutely no structural object that works as a UV blocking part, on one substrate, i.e., the first substrate 2A. Thus, by performing the UV irradiation from the first substrate 2A, as shown in FIG. 14(b), the UV light thereby irradiated with diffuses in the entire pre-polymerized mixture materials that are filled in the liquid crystal cell 50A of the liquid crystal panel 50. Thus, it is possible to further reduce the residual light polymerizable monomers present after the UV irradiation. The liquid crystal display panel 50 adopting the COA structure has a pretilt angle of 25° across the entire panel, as illustrated in FIG. 14(c), after the first irradiation.

Furthermore, since there remain few residual polymerizable monomers in the liquid crystal display panel 50 adopting the COA structure, a time during which the second irradiation is performed can be reduced to 12 hours, which is approximately a half of the time required for the method shown in FIGS. 11(a) through 11(c).

Embodiment 2

Another embodiment of a liquid crystal display device in accordance with the present invention is described as follows, with reference to the figures from FIGS. 15(a) through 15(b) to FIGS. 17(a) through 17(p). The present embodiment explains a difference between the present embodiment and Embodiment 1. Components having the same functions as those described in Embodiment 1 are given the same reference numerals, and the explanations thereof are omitted.

Figure 15:
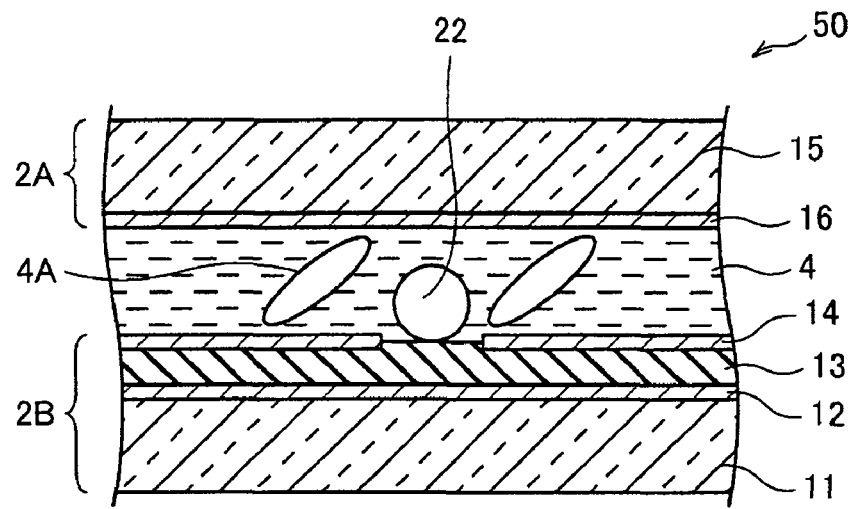
FIG. 15(a) is a cross-sectional view for schematically illustrating a main arrangement of the liquid crystal display panel of another embodiment in accordance with the present invention.
FIG. 15(b) is a plan view for schematically illustrating the generation of the bend nucleus in a part forming an aperture on the electrode substrate of the liquid crystal display panel illustrated in FIG. 15(a).
Figure 15:
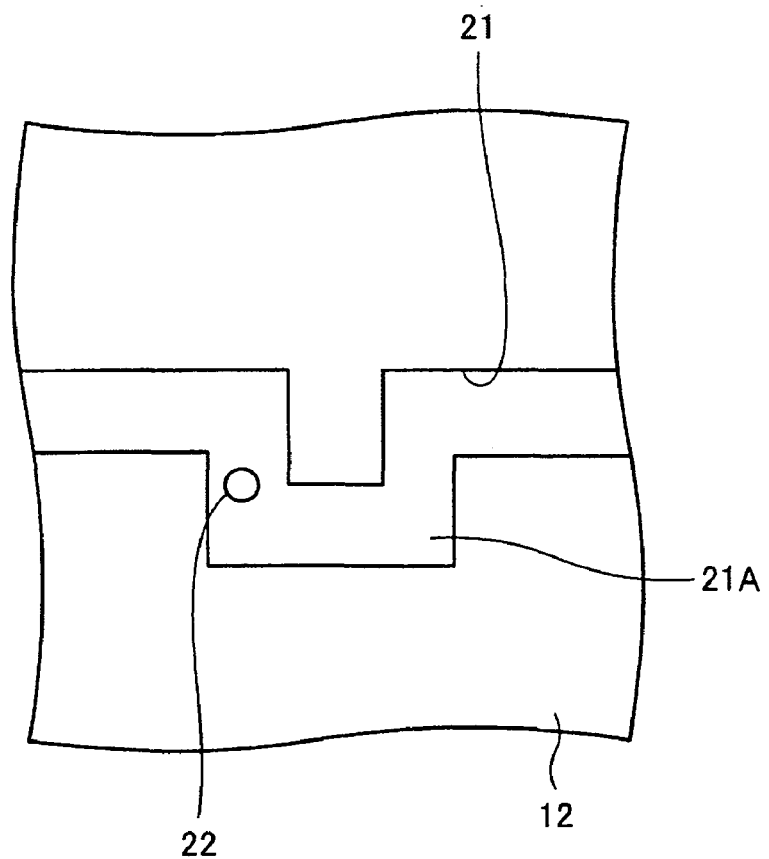
Figure 16:
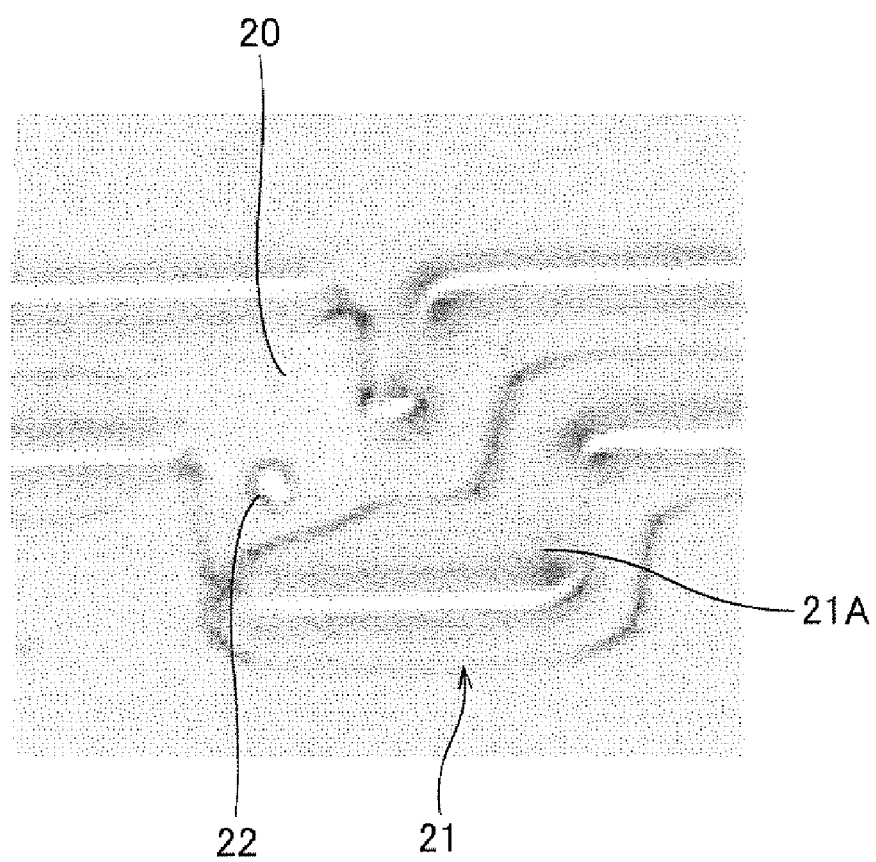
FIG. 16 is a micrograph showing the alignment transition to the bend alignment caused when the voltage is applied to the liquid crystal display panel.

FIG. 15(a) is a cross-sectional view for schematically illustrating a main arrangement of a liquid crystal display panel of a liquid crystal display device in accordance with the present embodiment. FIG. 15(b) is a plan view for schematically illustrating generation of a bend nucleus in a part forming an aperture on an electrode substrate (a first substrate) of the liquid crystal display panel. FIG. 16 is a micrograph for showing an alignment transition to bend alignment caused when a voltage is applied to the liquid crystal display panel 50 in accordance with the present embodiment.

As illustrated in FIGS. 15(a), 15(b), and 16, the liquid crystal display panel 50 of the present embodiment is different from a liquid crystal display panel 50 of Embodiment 1 in that a spacer 22 is provided, as a structural object, in an aperture 21 of a lateral electric filed generating structure.

The spacer 22 has (i) a spherical shape (a bead shape) and has (ii) a size substantially the same as a liquid crystal layer thickness of the liquid crystal display panel 50. It is preferable that the spacer 22 is disposed in a point at which (i) two domains interconnect with each other and (ii) the bend alignment (the bend nucleus) is developed in the aperture 21. Thus, it is preferable that the spacer 22 is disposed in a flexion 21A of the aperture 21.

Here, with reference to FIG. 16, the following description explains the alignment transition to the bend alignment in the liquid crystal display panel 50 in accordance with the present embodiment.

In the liquid crystal display panel 50 of the present embodiment, when the alignment transition to be caused by the voltage application is observed, a voltage weaker than that in Embodiment 1 is applied. Nevertheless, in the liquid crystal display panel 50 of the present embodiment, the bend nuclei are developed, and the alignment transition is extended from the thus developed nuclei to bend alignment 20, as shown in FIG. 16. That is, the alignment transition to the bend alignment 20 is caused by even a weak electric field (a divergence lateral electric field).

Though a mechanism that the presence of the structural object causes the bend nuclei to be generated by even the weak electric field remains unclear, it could be inferred as follows. That is, the bend nuclei are developed at a moment when the two domain caused by the lateral electric field interconnect with each other to break away one of them. It is inferred that the structural object works to cause the domain to be smoothly broken away.

Figure 17:
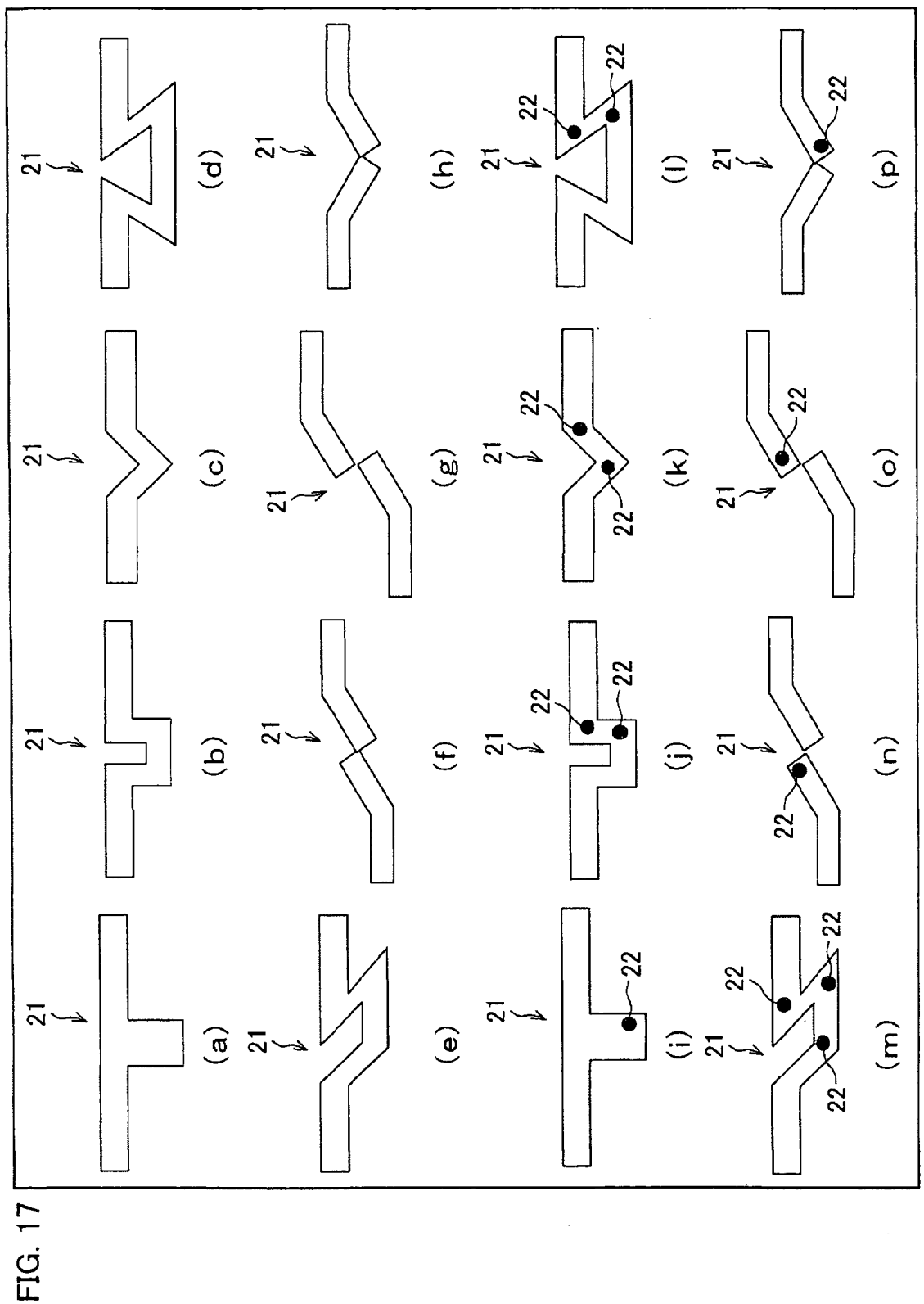
FIG. 17 is a view for illustrating exemplary shapes of the aperture of an embodiment in accordance with the present invention.

The above embodiments provide explanation by raising the example in which the aperture 21 of the lateral electric field generating structure mainly has the U-shaped vent. However, the present invention is not limited to this. Alternatively, the aperture 21 can have various shapes as illustrated in FIGS. 17(a) through (p). Particularly, it is preferable that the aperture 21 has a shape including at least one or more flexions, and more preferably, two or more flexions.

In particular, when the aperture 21 has the U-shaped vent (the flexion part) as illustrated in FIG. 17(b) or as described in Embodiment 1, the right twisted domains and the left twisted domains do not make contact with each other, as shown by the boundary A (see FIG. 5(b)), and the bend nucleus is developed therefrom. For this, in the case where the vent shape has the U-shape, the development of the bend nucleus is facilitated more, as compared to the case where the vent shape has the V-shape. Besides, since the aperture 21 has the U-shaped flexion part, plural bend nuclei become more likely to be developed in a single aperture. Thus, it is possible to further readily obtain the bend alignment. In this regard, the U-shape is more preferable for the vent shape, than the V-shape. As such, it is preferable that the aperture 21 has the U-shape, successive U-shapes, or the like so as to have at least one U-shaped flexion part.

Furthermore, the position at which the spacer 22 is disposed is not particularly limited. Thus, it is possible to dispose the spacer 22 in various positions other than in the flexion part of the aperture 21. Particularly, it is preferable to dispose the spacer 22 in the flexion part of the aperture 21.

Furthermore, the method for disposing the spacer 22 in the aperture 21 is not particularly limited. Thus, it is possible, for example, to use a method for disseminating the spacer 22 by spray, a method for providing the spacer 22 in an ink-jet style, and the like.

The present embodiment provides explanation by raising an example in which the spacer 22 is used as the structural object. However, the structural object provided in the aperture 21 is not limited to this. Thus, it is possible to use various structural objects capable of forming a convex and concave in the aperture 21. Such a structural object can be formed from a material such as, for example, metal or resin.

Furthermore, it is possible, for example, to use a photolithography technique so as to form the structural object directly in the aperture 21.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A liquid crystal display device in accordance with the present invention is capable of readily obtaining bend alignment across an entire liquid crystal display panel, (i) with obtaining a high speed responsiveness, a feature of an OCB mode, while obtaining brightness and (ii) without increasing a load on an activating driver. Thus, the liquid crystal display device in accordance with the present invention is widely usable in, for example, an image display device such as a television or a monitor, OA equipment such as a word processor, and an image display device provided in an information terminal such as a video camera, a digital camera, and a cellular phone.

The invention claimed is:

1. A liquid crystal display device, comprising:
   a liquid crystal layer sandwiched between a pair of substrates facing each other, in which liquid crystal layer, a state of liquid crystal molecules is transited from splay alignment to bend alignment when an electric field is applied, wherein:
   an electric field applying section for (i) applying a lateral electric field parallel to the substrates and (ii) bend-aligning the liquid crystal molecules is provided in a region corresponding to a pixel on the liquid crystal layer;
   the electric field applying section includes bilayer electrodes provided on different planes disposed with an insulation layer therebetween,
   of the bilayer electrodes, an electrode which is closer to the liquid crystal layer has an aperture on a part of a region where this bilayer electrode overlaps with another electrode via the insulation layer;
   the bilayer electrodes have a difference in electric potentials; and
   a structural object for forming a convex and a concave in the aperture is provided in the aperture, wherein the structural object is a spacer.

2. The liquid crystal display device as set forth in claim 1, comprising:
   a polymer layer on a boundary of each of the substrates and the liquid crystal layer,
   the polymer layer holding the liquid crystal molecules that are in contact with the polymer layer such that the liquid crystal molecules have pretilt angles of not less than 18° and not more than 36° when no voltage is applied.

3. The liquid crystal display device as set forth in claim 2, wherein:
   the polymer layer is formed up by polymerizing a polymerizable monomer added to the liquid crystal layer, the polymerization being performed while applying a voltage to the liquid crystal layer.

4. The liquid crystal display device as set forth in claim 3, wherein the polymerizable monomer is a bifunctional monomer.

5. The liquid crystal display device as set forth in claim 1, wherein the aperture has a shape having a flexion part.

6. The liquid crystal display device as set forth in claim 5, wherein the aperture has at least one U-shaped flexion part.

7. The liquid crystal display device as set forth in claim 1, wherein: the insulation layer has a thickness of not more than 0.5 μm.

8. The liquid crystal display device as set forth in claim 1, wherein of the bilayer electrodes, the electrode which is closer to the liquid crystal layer side is a picture electrode, whereas the other electrode is an auxiliary capacitance electrode.

9. The liquid crystal display device of claim 1, wherein: the liquid crystal molecules have a pretilt angle of not less than 18° and not more than 36°; and a product $\Delta nd$ of a refractive index anisotropy $\Delta n$ of the liquid crystal molecules and a thickness d of the liquid crystal layer is not less than 850 nm and not more than 1170 nm.

* * * * *